United States Patent [19]

Divan et al.

[11] Patent Number: 5,684,683
[45] Date of Patent: Nov. 4, 1997

[54] DC-TO-DC POWER CONVERSION WITH HIGH CURRENT OUTPUT

[75] Inventors: Deepakraj M. Divan; Nasser H. Kutkut, both of Madison, Wis.

[73] Assignee: Wisconsin Alumni Research Foundation, Madison, Wis.

[21] Appl. No.: 599,308

[22] Filed: Feb. 9, 1996

[51] Int. Cl.$^6$ ...................................................... H02M 7/00
[52] U.S. Cl. .................................. 33/65; 363/17; 363/71; 363/132
[58] Field of Search ..................... 363/37, 17, 65, 363/71, 132; 323/285, 271, 284, 283

[56] References Cited

U.S. PATENT DOCUMENTS

| | | |
|---|---|---|
| 3,443,195 | 5/1969 | Hoffman, Jr. et al. |
| 3,717,808 | 2/1973 | Homa. |
| 3,725,741 | 4/1973 | Misencik. |
| 3,835,430 | 9/1974 | Kocsis. |
| 3,961,292 | 6/1976 | Davis. |
| 4,055,791 | 10/1977 | Bland et al. |
| 4,134,091 | 1/1979 | Rogers. |

(List continued on next page.)

OTHER PUBLICATIONS

Kevan O'Meara, "A New Output Rectifier Configuration Optimized for High Frequency Operation", HFPC, Jun. 1991 Proceedings, pp. 219–225.

C. Peng, et al., "A New Efficient High Frequency Rectifier Circuit", HFPC, Jun. 1991 Proceedings, pp. 236–243.

William A. Peterson, et al., "A Clamped Transformer Power Supply Producing Zero Voltage Resonant Transitions Over the Full Load Range", IEEE, pp. 287–292, 1994.

Nasser H. Kutkut, et al., "An Improved Full–Bridge Zero–Voltage Switching PWM Converter Using a Two–Inductor Rectifier", IEEE Trans. on Ind. App., vol. 31, No. 1, pp. 119–126, Jan./Feb. 1995.

Y. Nagai, et al., "A 48V 100A Switching Power Supply Unit and Its Application," INTELEC '88 Conference Proceedings, 1988, pp. 421–428.

"Design Review: A 300W, 300KHz Current–Mode Half Bridge Power Supply With Multiple Outputs Using Coupled Inductors," in *Unitrode Switching Regulated Power Supply Design Seminar Manual* by Unitrode Corporation, 1990, pp. A1–1 to A1–6.

Oliver D. Patterson, et al., "Pseudo–Resonant Full Bridge DC/DC Converter," IEEE Trans. on Power Elec., vol. 6, No. 4, Oct. 1991, pp. 671–678.

*Primary Examiner*—Peter S. Wong
*Assistant Examiner*—Rajnikant B. Patel
*Attorney, Agent, or Firm*—Foley & Lardner

[57] ABSTRACT

A DC-to-DC converter for high current outputs is provided having an input side circuit, including two converter bridges, and an output side circuit, including two diode rectifier configurations. The input and output circuits are preferably connected by a co-axial winding transformer (CWT). Switches in the input side bridges alternately connect and disconnect a DC input voltage to and from the primary side of the transformer. The waveform appearing on the secondary of the transformer is rectified by the output side rectifier configurations. A switched-in bias voltage in each input side converter bridge provides for reversal of the current in the bridge after the bridge is switched off, and before the other bridge is switched on. This current reversal allows a current in one of the rectifier configurations of the output side circuit to be brought softly to zero before being reversed biased by the switching on of the other converter bridge. Thus, a reverse recovery spike in the output circuit is avoided. For high current outputs, the CWT is preferably constructed of a copper tube secondary winding enclosing the primary windings. The rectifier configurations include multiple diodes arranged in symmetrical configurations for optimal sharing of the high output currents. Air and water cooling of the diode configurations and output bus bars is provided. The output side circuit assembly can be provided as an integrated unit which is attached between the CWT and the load attached to the converter output.

47 Claims, 18 Drawing Sheets

U.S. PATENT DOCUMENTS

| | | |
|---|---|---|
| 4,184,197 | 1/1980 | Cuk et al. . |
| 4,222,016 | 9/1980 | Stock et al. . |
| 4,253,136 | 2/1981 | Nanko . |
| 4,336,583 | 6/1982 | Campbell et al. . |
| 4,386,394 | 5/1983 | Kocher et al. . |
| 4,415,959 | 11/1983 | Vinciarelli . |
| 4,441,146 | 4/1984 | Vinciarelli . |
| 4,464,710 | 8/1984 | Gruber ................................. 363/22 |
| 4,481,565 | 11/1984 | Colton . |
| 4,486,823 | 12/1984 | Palm . |
| 4,499,531 | 2/1985 | Bray . |
| 4,675,797 | 6/1987 | Vinciarelli . |
| 4,688,160 | 8/1987 | Fraidlin . |
| 4,853,832 | 8/1989 | Stuart ................................. 363/17 |
| 4,899,271 | 2/1990 | Seiersen . |
| 5,027,264 | 6/1991 | DeDoncker et al. . |
| 5,157,319 | 10/1992 | Klontz et al. . |
| 5,181,170 | 1/1993 | Huang et al. . |
| 5,224,025 | 6/1993 | Divan et al. . |
| 5,267,138 | 11/1993 | Shores ................................. 363/98 |
| 5,301,096 | 4/1994 | Klontz et al. . |
| 5,341,083 | 8/1994 | Klontz et al. . |
| 5,341,280 | 8/1994 | Divan et al. . |
| 5,341,281 | 8/1994 | Skbiniski ................................. 363/39 |

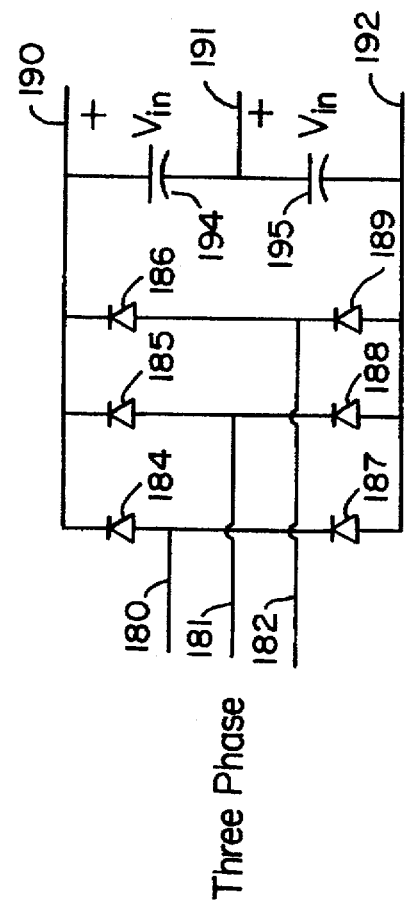
FIG. 6 Three Phase
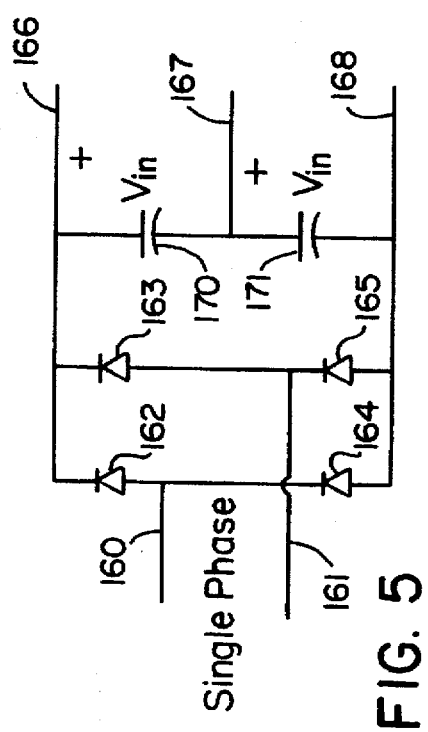
FIG. 5 Single Phase
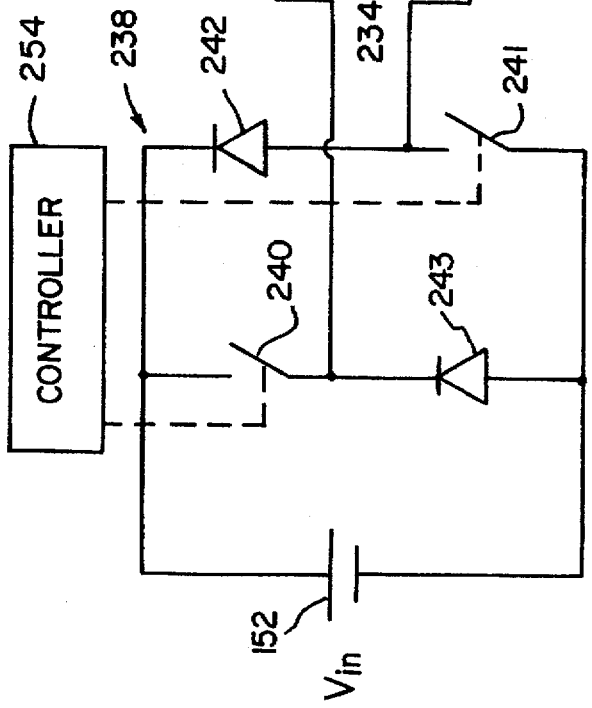
FIG. 7

M4: S2 & D4 ON, Ds1 & Ds2 ON

M5: S2 & D4 ON, Ds1 ON, Ds2 OFF

M6: TURN ON S6 & S7
S2 & D4 ON, Ds1 ON, Ds2 OFF

M7: S6 & S7 ON, Ds1 ON

DC-TO-DC POWER CONVERSION WITH HIGH CURRENT OUTPUT

FIELD OF THE INVENTION

This invention pertains generally to the field of electrical power conversion systems, and particularly to DC-to-DC power converters for high current outputs.

BACKGROUND OF THE INVENTION

A variety of circuit designs have been developed for DC-to-DC power conversion. Such circuits provide power from a DC source at one voltage level to a load at a second controlled voltage or power level. One typical converter design employs semi-conductor switching devices to couple the DC input source to the primary of a transformer. The switching devices are controlled to create an AC waveform on the primary of the transformer. DC power to the load is then provided by rectifying the resulting AC voltage appearing on the secondary of the transformer. In such a converter, the ratio of output voltage to input voltage is determined by a combination of the turns ratio of the transformer and the duty cycle of the input side switching devices.

A conventional DC-to-DC converter of the type just described is shown in FIG. 1. This converter includes a switched input bridge structure 40 which is operated to apply the DC input voltage $V_{in}$ across the primary windings of a transformer 42. A full wave rectifier bridge 44 is connected to the secondary of the transformer 42. The rectifier 44 is a current multiplying rectifier which provides DC current to the load, represented by a resistor 46. (The capacitor 47 filters the output voltage waveform.)

The converter shown in FIG. 1 operates as follows. When switches 48 and 49 are closed, the input voltage $V_{in}$ is applied across the primary winding 50 of the transformer 42. This causes a voltage to appear across the secondary 52 of the transformer which is related to the input voltage $V_{in}$ by the turns ratio of the transformer. This, in turn, causes diodes 54 and 55 to conduct, delivering current from the transformer winding 52 through the inductor 56 to the output 46. When the switches 48 and 49 are opened, the voltage applied to the transformer 42 is removed. Current built up in the primary winding 50 is allowed to flow through the diodes 58 and 59 until dissipated. Current stored in the output side inductor 56 continues to supply the load 46. Switches 60 and 61 are then closed, connecting the DC input voltage $V_{in}$ across the primary 62 of the transformer 42. Switches 60 and 61, however, connect $V_{in}$ to the transformer 42 in reversed polarity. This causes output side diodes 64 and 65 to conduct, delivering current from the transformer winding 52 through the inductor 56 to the output 46. Since the current fed through the inductor 56 is in addition to the current stored in the inductor 56 during the previous half of the rectifier cycle, the rectifier 44 acts as a current multiplier. When switches 60 and 61 are opened, any current stored in the primary winding 62 is allowed to flow through diodes 66 and 67. The cycle may then be repeated by the closing of switches 48 and 49.

Another typical prior art DC-to-DC converter system is shown in FIG. 2. This converter employs the same switched bridge structure 40 as used in the converter circuit of FIG. 1 to apply the DC input voltage $V_{in}$ across the primary of the transformer 42. As described above, the polarity of the input voltage as applied to the transformer 42 is reversed each half cycle. As above, the output side rectifier 70 is a current multiplier. This rectifier 70 uses only two diodes 72 and 73 but requires a transformer secondary 74 with a central tap. During a first half of the converter cycle, when switches 48 and 49 are closed, diode 72 conducts current from half of the transformer secondary 74 through the inductor 56 to the load 46. During the second half of the cycle, switches 60 and 61 are closed and diode 73 conducts current from the other half of the transformer secondary 74 through the inductor 56 to the load 46. Once again, this current is in addition to current stored in the inductor during the previous half cycle. Use of the rectifier 70 shown in FIG. 2 will generally involve higher copper losses in the secondary and requires a more complicated three terminal secondary connection than the rectifier 44 shown in FIG. 1. However, the rectifier 44 shown in FIG. 1 requires more diodes, resulting in a higher voltage drop between the secondary and the load 46.

Of particular interest in the design of DC-to-DC converter circuits are the voltage and current control obtained at the output, and the efficiency and cost of the circuit. Higher switching frequencies have been found to be the key to reducing the size of the transformer and the filter elements employed in the converter. Typical converter semiconductor switching devices include power transistors, silicon controlled rectifiers (SCRs) or thyristors, gate-turn-off (GTO) thyristors, insulated-gate-bipolar-transistors (IGBTs), and the like. Many such semiconductor switching devices will experience switching losses when switched in the presence of high voltages or currents. To increase switching frequencies, therefore, it is apparent that some form of soft switching converter—wherein the input switching devices are switched at near zero voltages or currents to result in near zero switching losses—will be required if system efficiencies and converter size are to be maintained at reasonable levels.

The concerns of switching efficiency and the reduction of switching device stresses are particularly acute for DC-to-DC converters intended to provide high current outputs. Such converters are used, for example, in electroplating processes where the output current can typically range from 500–5,000 amperes (Amps). For such circuits, the focus of concern shifts to the output side of the converter circuit. The rectifier devices used on the output side of high current output converters will be exposed to large device stresses in the process of rectifying the high current DC output. Such devices will be typically required to switch rapidly from conducting to non-conducting states in the presence of high currents. This can result in large spikes due to the reverse recovery of the rectifier devices.

A traditional approach to DC-to-DC conversion for high current outputs has employed a thyristor phase controlled output. Such systems are usually low voltage systems having large transformers and the typical problems associated with the use of thyristor switches are encountered. In particular, thyristor commutation requirements dictate higher current and VA ratings for other circuit components and thyristor recovery times significantly slow down the maximum switching frequencies attainable. Also, snubber inductors and RC networks may be needed to effect current transfer without encountering a diode recovery problem. Finally, capacitive filters may have to handle ripple currents at least as large as the load current. Switched mode DC-to-DC converter systems for high current outputs have also been attempted, but such systems encounter significant parasitics.

A DC-to-DC converter topology for high current outputs, which affords both zero voltage switching of the input side switching devices and commutation of the rectifier diodes in the output side circuit to eliminate output side voltage spikes, was presented in Nasser H. Kutkut, et al., *An*

*Improved Full Bridge Zero-Voltage Switching PWM Converter Using a Two-Inductor Rectifier*, IEEE Trans. on Ind. App., Vol. 31, No. 1, January/February 1995. This converter circuit is shown in FIG. 3. A full bridge converter 80 connects the DC input voltage $V_{in}$ to a transformer 82. A two inductor rectifier circuit 84 is connected to the secondary of the transformer 82. (The rectifier circuit 84 will be recognized as having the same basic circuit structure as the long known mercury-arc type rectifier.) In this topology zero voltage switching of the input side switching devices is achieved using energy stored in the output filter inductors. This allows the transformer leakage inductance to be reduced drastically, to allow output side diode commutation prior to reversing the polarity of the voltage applied to the transformer 82 by the full bridge converter 80. This, in turn, results in elimination of voltage spikes in the output circuit 84. The need for a transformer with very low and controlled leakage inductance makes the coaxial winding transformer (CWT) the preferred structure for the transformer 82. Due to its coaxial structure, the leakage inductance can be controlled and made very small.

The switches in the input side converter 80 are switched in a sequence to provide both zero voltage switching of the input side circuit 80 and commutation of the diodes in the output circuit 84. As shown in FIG. 3, the switches in the input side converter 80 are implemented as transistors (MOSFETs) with anti-parallel connected diodes and parallel connected capacitances. Zero voltage turn on for the input side switching devices can be achieved by introducing a phase shift between the switches in the right leg (leading leg) of the converter bridge 80, and those of the left leg (lagging leg) of the converter bridge. In addition, the phase shift determines the duty cycle of the converter. Zero voltage switching is achieved using energy stored in the secondary filter inductors to discharge the output capacitance of the switches before turning them on.

The operation of the DC-to-DC converter circuit shown in FIG. 3 is described as follows. With input side switches 86 and 87 conducting, the voltage across the primary 88 of the transformer 82 will be $+V_{in}$. The resulting voltage appearing on the secondary 89 of the transformer 82 will cause output side diode 90 to be turned off and output side diode 91 to conduct. During this period the current in the secondary 89 causes the current $I_1$ in the output inductor 92 to build up. This current is added to the current $I_2$ in the other output side inductor 93 to supply the load represented by the resistor 94 with a high current output. (The output capacitor 96 filters the output voltage waveform.) The combined current $I_1$ and $I_2$ is carried by the diode 91. The input side switch 87 is then turned off. Although the voltage applied to the primary 88 of the transformer 82 disappears at this point, the energy stored in the secondary side inductor 92 induces a current in the primary side circuit 80 which charges the output capacitance 98 of the switch 87 and discharges the output capacitance 100 of the input side switch 102, causing the diode 104 to conduct. After the diode 104 starts conducting, the switch 102 can be turned on under zero voltage switching conditions. In order to ensure zero voltage switching for switch 102, a dead time is needed between the turn off of switch 87 and the turn on of switch 102 to ensure that diode 104 conducts prior to the turn on of switch 102.

While the switch 86 and the diode 104 are conducting, the current in the primary winding 88 of the transformer 82 decays and the current in output side diode 90 ramps up while the current in diode 91 ramps down at the same rate. The parasitic voltage drops across the switch 86 and diode 104 cause the current $I_2$ to become negative during this mode, the secondary side diode 91 will thus commutate and diode 90 will entirely take over the supplying of current to the load 94. As a result of the reversal of current $I_2$, the current in the primary 88 of the transformer 82 will be the reflected secondary inductor current $I_2$. When switch 86 is then turned off, the energy available from the inductor 93 charges the output capacitance 106 of switch 86 and discharges the output capacitance 108 of switch 110 causing diode 112 to conduct. This results in a zero voltage across the switch 110 allowing it to be turned on under zero voltage switching conditions. Once again, a delay time is needed between the turn off of switch 86 and the turn on of switch 110.

With switches 102 and 110 turned on, the DC input voltage $V_{in}$ is applied to the primary winding 88 of the transformer 82. This causes a voltage to appear on the secondary winding 89 which causes output side diode 90 to be turned on and output side diode 91 (which is already commutated) to be turned off. The current in the secondary winding 89 causes the current in the output side inductor 93 to build up. The combined currents ($I_1$ and $I_2$) from the inductors 92 and 93 are thus provided to the load 94. The switching cycle is then continued, in a manner similar to that described above, with the turning off of switches 102 and 110 and the zero voltage switching on of switches 86 and 87. Note that since the secondary diodes 90 and 91 are commutated prior to switching the polarity of the voltage on the primary winding 88 of the transformer 82, no voltage spike will occur on the secondary side 89 of the transformer 88. However, to achieve commutation with this topology, the currents $I_1$ and $I_2$ in the secondary side inductors 92 and 93 will have high ripple components which reduces converter efficiency at light loads.

SUMMARY OF THE INVENTION

In accordance with the present invention, a DC-to-DC converter for high current outputs is provided which is characterized by soft recovery of the rectifier devices on the output side of the converter while keeping output side ripple currents low. Thus, reverse recovery spikes and high device stresses associated with the reverse biasing of the rectifier devices is avoided. The input side switching devices, e.g., IGBTs, may be switched at a high frequency, e.g., 20 kHz, under zero voltage switching conditions with near zero turn-on losses, and are not overstressed in terms of device utilization. The present invention is further preferably implemented to take advantage of the recognition that, at current levels of greater than 1,000 Amps, the manner of operation on the high current side of the converter is much more important than the high voltage side operation.

The DC-to-DC converter of the present invention includes two forward converters connecting a DC source across primaries of a transformer. The DC source may preferably be implemented as an AC to DC converter for receiving AC power on AC bus lines and producing DC power on DC bus lines. The forward converters may be connected effectively in parallel, or, if desired, effectively in series to reduce input side voltage stresses on the converter switching devices. The forward converters include switching devices, such as IGBTs, which alternately connect the DC source voltage in opposite polarities to the transformer primary through each converter bridge, producing a waveform on the transformer secondary. An output side converter is connected to the secondary of the transformer. The output side converter includes rectifying devices which rectify the voltage waveform appearing on the transformer secondary to produce a DC output voltage. Preferably, an output side converter topology including two inductors is used to provide DC current to a load. The rectifier devices in the output side converter, e.g., diodes, are softly driven to zero current during each cycle before being reverse biased. Thus, reverse recovery spikes are avoided as the forward converters are alternately switched to provide power to the transformer. The driving of the output side diode current softly to zero is achieved by switching a bias voltage, having a polarity opposite to that of the voltage source input voltage, into the forward converter circuits of the primary side just after the switching off of one of the converters and prior to the switching on of the other converter. A resulting reversal of current in the primary of the transformer allows the output diode current to be softly driven to zero. The bias voltage source is preferably implemented using a small second DC-to-DC converter circuit, operating off of the input DC source, which allows full control of the switched-in bias voltage. The DC bias voltage may also be provided from an auxiliary transformer or from a separate AC-to-DC converter operating from AC line power.

The DC-to-DC converter of the present invention is particularly suited to applications requiring high current output from the converter. For the high current outputs, the physical construction of the transformer and output side circuit is of particular importance. Maintaining reasonably low leakage inductance in the transformer is important if lost duty cycle is to be minimized. Unlike prior converters, the circuit of the present invention does not require high leakage inductance to provide soft diode recovery, and can provide diode commutation while keeping output side ripple currents low. A preferable transformer which incorporates the desired characteristics is a co-axial winding transformer (CWT) which includes a copper tube for the secondary winding, with the primary winding fully enclosed therein. Several alternative constructions for this type of transformer are possible, for example, using either bent or straight copper tubes for the transformer secondary.

Where the output side rectifier circuit of the converter of the present invention will carry high currents, e.g., in the range of 1,000–5,000 amps, multiple high volume diodes are typically employed. The multiple diodes are arranged such that static and dynamic current sharing among the diodes is achieved. To minimize leakage, the diodes are preferably integrated into an assembly which is inserted as much inside the outer winding tube of the transformer as possible. For such high currents, provision is also preferably made to remove heat, for example, by air or water cooling of the output bus bars of the converter.

Further objects, features, and advantages of the invention will be apparent from the following detailed description when taken in conjunction with the accompanying drawings.

BRIEF DESCRIPTION OF THE DRAWINGS

FIG. 5 is a schematic circuit diagram of a single phase diode bridge for providing a DC input voltage to the DC-to-DC converter of the present invention from a single phase AC source.

FIG. 6 is a schematic circuit diagram of a three phase diode bridge for providing a DC input voltage to the DC-to-DC converter of the present invention from a three phase AC source.

FIG. 7 is a schematic circuit diagram of a simple DC-to-DC converter for providing the bias voltage for the circuit shown in FIG. 4.

DETAILED DESCRIPTION OF THE INVENTION

Figure 1:
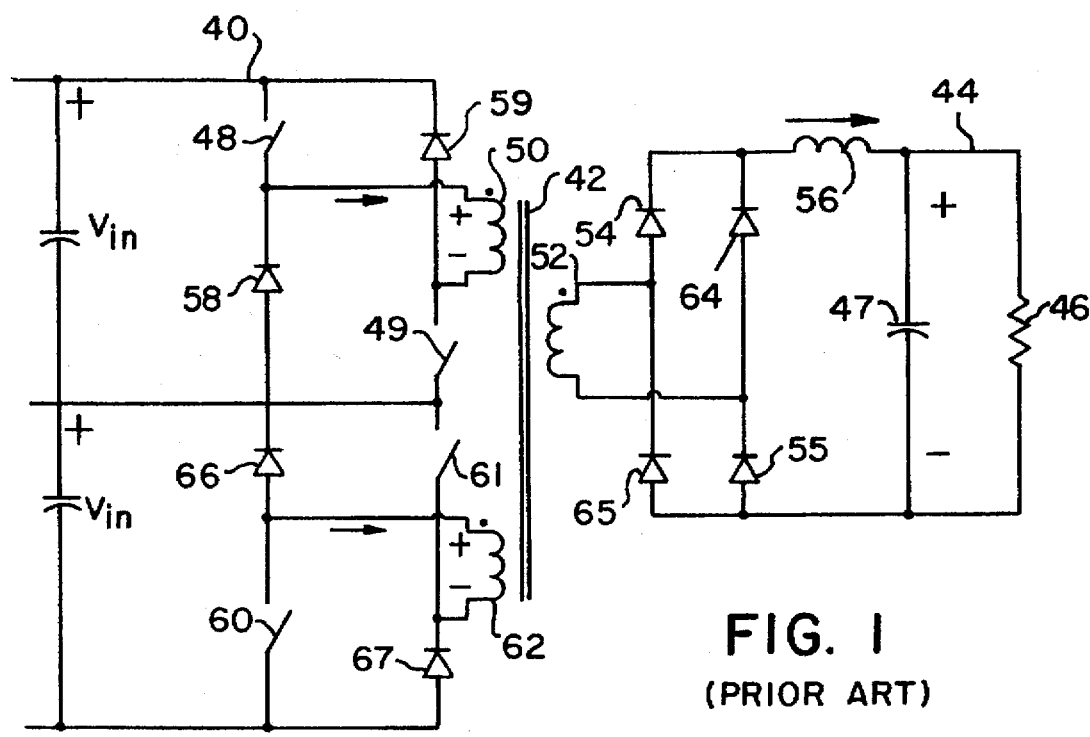
FIGS. 1–3 are schematic circuit diagrams of prior art DC-to-DC converters having high current outputs.
Figure 2:
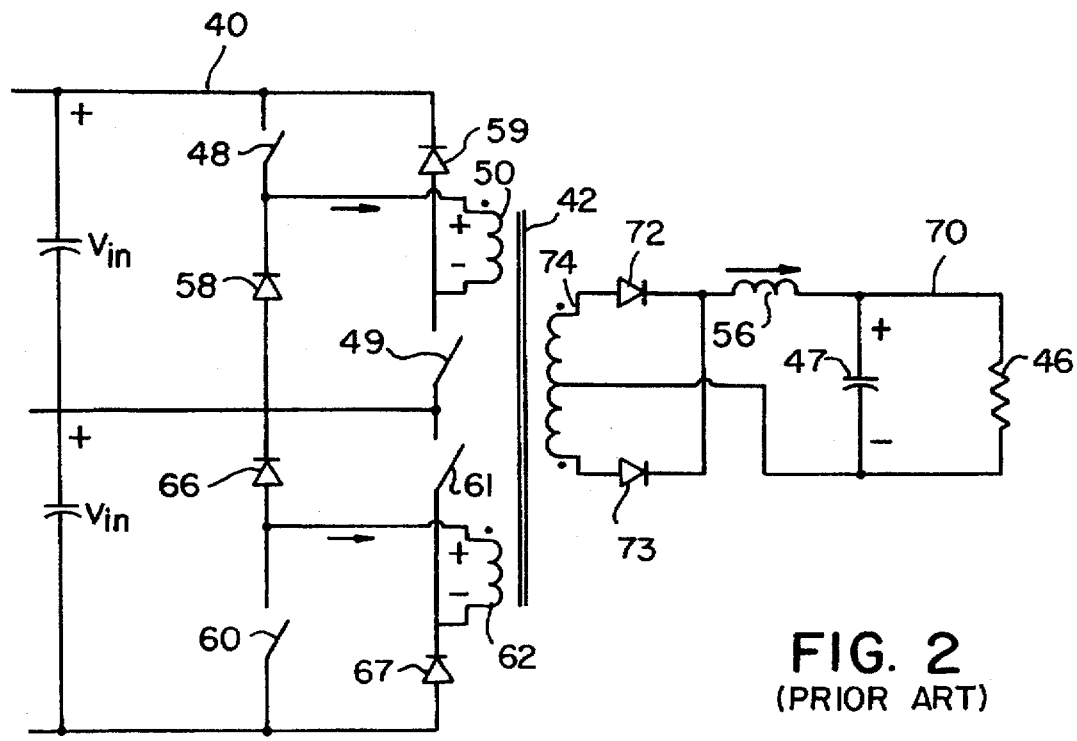
Figure 3:
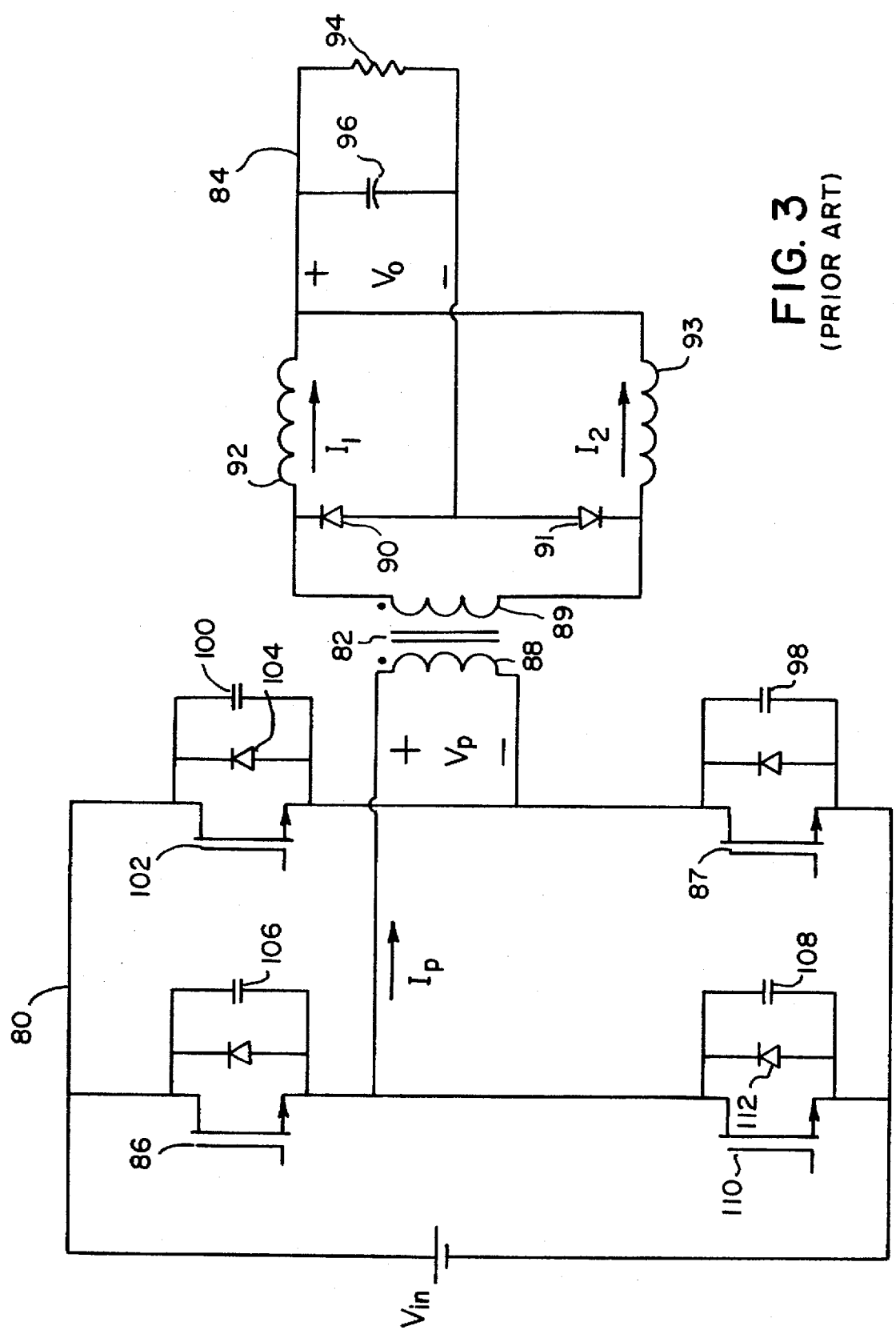
Figure 4:
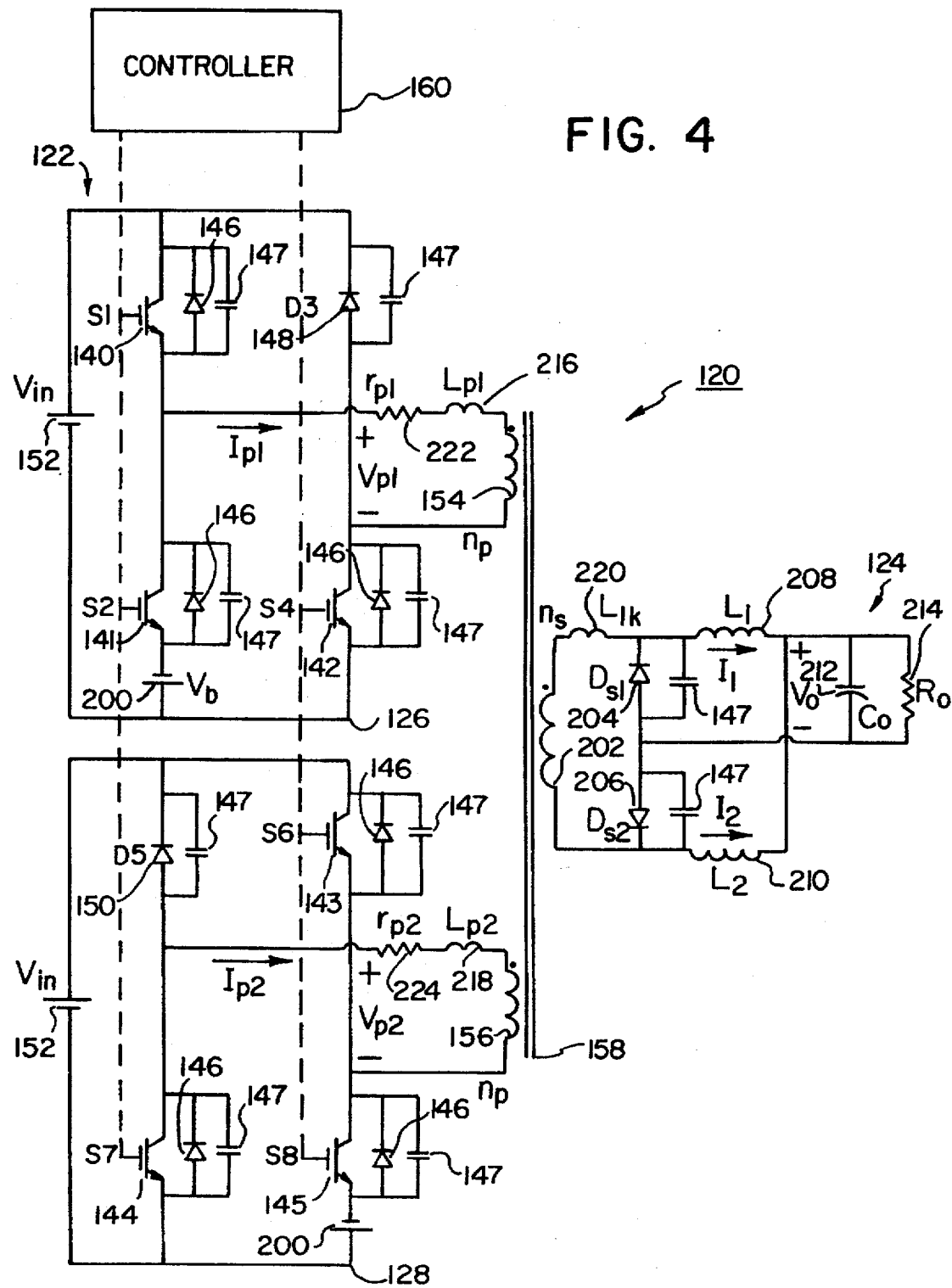
FIG. 4 is a schematic circuit diagram of a dual bridge DC-to-DC converter for high current outputs in accordance with the present invention.

A schematic circuit diagram of a DC-to-DC converter in accordance with the present invention is shown generally at 120 in FIG. 4. This figure is used first to describe the DC-to-DC conversion process, which is generally applicable to all embodiments of the present invention, as well as to point out the output side rectifier commutation problem which converters in accordance with the invention correct. The converter 120 includes an input or primary side 122 and an output side 124. The input side includes two forward converters 126 and 128. Each of the forward converters 126 and 128 includes three switches 140, 141, 142 and 143, 144, 145, respectively, and a diode 148 and 150, respectively. FIG. 4 shows the converter switches in their preferred form, as transistors, such as insulated-gate-bipolar-transistors (IGBTs), with associated reverse conducting diodes 146. Capacitances 147, shown across the diodes and switching devices in the circuit 120 represent internal parasitic capacitances of the IGBTs and diodes. Although additional snubber capacitances may be added across these diodes and devices, this may not be necessary. The switches and diode of each converter 126 and 128 form a bridge connecting an input DC voltage source 152, which provides a voltage of magnitude $V_{in}$, across primary windings 154 and 156 of a transformer 158. The opening and closing of the switches 140–145 may be controlled by any conventional analog or digital switch control mechanism 160 which provides the desired switching sequence, frequency, and duty cycle. Such switch controllers are well known in the art of power conversion. An exemplary implementation of such a controller is described in more detail below. The switching frequency is preferably at least 20 kHz.

The input voltage source 152 may be any DC supply, such as a battery, but is typically the output of an AC-to-DC converter which provides the DC input voltage $V_{in}$ from an AC power source, such as utility AC power lines. A variety of AC-to-DC converter designs may be used to implement the AC-to-DC conversion. A simple and inexpensive method of implementing the AC-to-DC conversion is via a single or three phase diode bridge. An exemplary single phase bridge is shown in FIG. 5. A single phase AC input is applied to the bridge on lines 160 and 161. The diodes 162–165 act to rectify the AC voltage into a DC signal on output lines 166–168. The output signal is filtered by capacitors 170 and 171. The output lines 166–168 may thus be connected to the forward converters 126 and 128 of the DC-to-DC converter 120 to provide the DC input voltage $V_{in}$. Where three phase AC power is available, a three phase diode bridge may be used to provide the DC input voltage. An exemplary three phase bridge is shown in FIG. 6. A three phase AC input is applied to the bridge on lines 180–182. The diodes 184–189 act to rectify the AC voltage into a DC signal on output lines 190–192. The output signal is filtered by capacitors 194 and 195. The output lines 190–192 may thus be connected to the forward converters 126 and 128 of the DC-to-DC converter 120 to provide the DC input voltage $V_{in}$.

In addition to the switches 140–145, and diodes 148 and 150, each converter bridge 126 and 128 includes a bias voltage 200 of magnitude $V_b$, and of polarity opposite to that of $V_{in}$. The bias voltage $V_b$ is switched into the converter bridges 126 and 128 by the switches 141 and 145, respectively. Though shown as separate elements for each bridge 126 and 128, the input voltage source 152 and the bias voltage source 200 may be common for both bridges 126 and 128. The use of the bias voltage source 200 to provide commutation of rectifiers in the output side 124 of the converter 120 is described in more detail below.

The output side 124 of the converter 120 is connected to a secondary winding 202 of the transformer 158. The output side preferably includes two rectifier devices 204 and 206, with their anodes connected together, and with the cathode of each rectifier device connected to an opposite end of the transformer secondary 202. Note that it is also possible to reverse the connection of the devices 204 and 206 so that the cathodes are connected together, with each anode connected to an end of the secondary winding 202. Though shown, and referred to hereafter, as single diodes, the rectifier devices 204 and 206 will typically be implemented as an arrangement of multiple diodes in parallel to accommodate high currents. As described above, the capacitances 147 represent the internal parasitic capacitance of the diodes 204 and 206. Inductors 208 and 210 are connected between the diode cathodes and one terminal of an output capacitor 212 and a load 214 (shown as a resistor for convenience). The joined anodes of the diodes 204 and 206 are connected to the opposite terminals of the capacitor 212 and load resistance 214. The output capacitor 212 may be part of the converter output circuit 124 or may be the inherent capacitance of the load to which the converter 120 is attached. The output voltage produced by the converter 120 across the load 214 is $V_o$.

The DC-to-DC converter circuit 120 operates to convert the DC input voltage $V_{in}$ to the DC output voltage $V_o$ in basically the following manner. With the switches 143–145 in the second forward converter bridge 128 open, disconnecting $V_{in}$ from the primary winding 156, the switches 140 and 142 in the first converter bridge 126 are closed. This imposes the input voltage $V_{in}$ across the primary winding 154 of the transformer 158. A voltage—the magnitude of which depends on the input voltage $V_{in}$ and the turns ratio $(n_s n_p)$ of the transformer 158—appears across the secondary winding 202 of the transformer 158. This voltage back-biases the diode 204 and forward biases the diode 206. Current $I_1$ flows from the secondary winding 202 through the inductor 208 to the converter output at the capacitor 212 and the load resistor 214. The return current flows to the secondary 202 through the diode 206.

During this period, the current $I_1$ builds up in the inductor 208 and charges the capacitor 212. The capacitor 212 will filter the power supplied to the load 214. Moreover, the capacitor 212 provides a relatively low impedance current path, as compared to the inductors 208 and 210, which prevents circulation of current through the circulating path consisting of the series connection of the secondary winding 202 and inductors 208 and 210. Since the inductors 208 and 210 are filter inductors, which are large in value, the amount of circulating current is minimal.

The switches 140 and 142 in the first converter bridge 126 are then opened. This removes the voltage source 152 from across the primary winding 154 and removes the applied voltage from the secondary winding 202. However, since the current in the inductive primary winding 154 cannot instantaneously drop to zero, a current will free wheel in the diode 148 and the diode 146 associated with switch 141. If the current path through the diodes 148 and 146 were not available, a large voltage transient would be developed across the primary winding 154 which would adversely affect the desired smooth output voltage.

The cycle continues with the second converter bridge 128. The switches 143 and 144 are closed, connecting the input voltage $V_{in}$ across the primary winding 156 of the transformer 158. Due to the direction with which the primary winding 156 is connected to the input source 152 by the switches 143 and 144, a voltage with polarity opposite to that applied by the first converter bridge 126 appears at the transformer secondary 202. This voltage reverse biases the diode 206 and forward biases the diode 204. The transformer secondary current $I_2$ flows through the inductor 210 to the capacitor 212 and load resistance 214 at the output. This load current is in addition to the current $I_1$ which was built up in the inductor 208 during the last half cycle. The total current $I_1+I_2$ flows through the forward biased diode 204. When the switches 143 and 144 are opened, the source voltage is no longer provided to the primary 156 and across the transformer 158 to the secondary 202, and a freewheeling current appears in the input side diode 150 and the diode 146 associated with switch 145. The cycle is then repeated with the switching on of the switches in the first converter bridge 126. In this way, an essentially AC voltage waveform is generated on the transformer secondary 202 Which is rectified and applied to the load resistor 214 and capacitor 212 by the action of the output side diodes 204 and 206.

During each time that one of the converter bridges 126 or 128 is on, current builds up in one of the inductors 208 or 210, and a charge voltage builds up in the capacitor 212. In the time between the turn-off of one converter bridge and the turn-on of the second converter bridge, the energy stored in the inductors 208 and 210 is provided to the load. By adjusting the ratio of the total on time of the converters 126 and 128 to the off time of the converters (when neither converter bridge connects the input voltage 154 to the transformer 158), the magnitude of the output voltage $V_o$ with respect to the input voltage $V_{in}$ may be regulated. Thus, the ratio of the output voltage $V_o$ to the input voltage $V_{in}$ is a function of both the duty cycle of the converter bridges 126 and 128 and the turns ratio ($n_s/n_p$) of the transformer 158.

Ignoring the effect of the bias voltage 200, a deficiency of the basic DC-to-DC conversion process just described becomes apparent when circuit operation is examined more closely for the period between the turn-off of one converter bridge and the turn-on of the second converter bridge. As discussed above, before the first converter bridge 126 is turned off, the diode 206 is forward biased and the diode 204 is reverse biased. When the converter bridge 126 is turned off, the voltage source $V_{in}$ is removed from the primary of the transformer and, therefore, the voltage on the secondary of the transformer 202 also disappears. As the current in the secondary 202 of the transformer 158 begins to decline, the diode 204 becomes forward biased to pick up the current $I_1$ flowing in the inductor 208. The diode 206 remains forward biased and continues to conduct current. If, at this point, the second converter bridge 128 is turned on, diode 206 would suddenly be reverse biased, due to the high di/dt caused by the source driving the leakage inductance of the transformer 158. This causes reverse recovery problems and ringing between the leakage inductance and the diode junction capacitors. The resulting transient voltage is normally twice the applied voltage. Thus, diodes 204 and 206 with higher voltage withstanding capability would be required. The same condition is experienced by the diode 204 during the transition from the turn-off of the converter bridge 128 to the turn-on of the converter bridge 126.

It is preferable, therefore, to drive the current in the conducting diode of the output side circuit 124 softly to zero before switching-in the second converter bridge to avoid the reverse recovery spikes. However, without the use of the bias voltage $V_b$, this soft recovery cannot be achieved without causing high ripple components to be formed in the currents $I_1$ and $I_2$ in inductors 208 and 210 which reduces converter efficiency at light loads. For diode commutation to occur, the outgoing diode, say diode 206, must be driven off. This requires that the other diode, diode 204, pick up the combination of currents $I_1+I_2$. Referred to the primary side 122 of the converter 120, this requires a reversal of current in the converter bridges 126 and 128 during the freewheeling mode. As described further below, this is accomplished in the present invention by use of the bias voltage $V_b$, having a polarity opposite the input voltage $V_{in}$. Control of the output side diode commutation process can then be finely tuned and controlled by use of the bias voltage $V_b$.

In order to better explain the operation of the converter circuit 120 to commutate the output side diodes 204 and 206, leakage inductances 216, 218, and 220, associated with the primary and secondary windings 154, 156 and 202 of the transformer 158, respectively, have been represented in FIG. 4. Resistances 222 and 224 are also shown to represent the resistances associated with the primary windings 154 and 156, respectively, of the transformer 158. The corresponding leakage inductance values are $L_{p1}$, $L_{p2}$, and $L_{lk}$, and the corresponding resistance values are $r_{p1}$, $r_{p2}$.

Control of the bias voltage $V_b$ is an important issue. $V_b$ is dynamically controlled in accordance with the invention to bring the current in the output side diodes 204 and 206 to zero at the right time. The presence of a dynamically controlled bias voltage $V_b$ does not significantly restrict circuit operation, and allows for output side diode currents to be brought to zero before turn-on of the incoming converter bridge, thereby avoiding reverse recovery spikes in the output side diodes and significant ripple components in the output side inductor currents.

The bias voltage source 200 may be implemented in various ways, including by the use of a DC-to-DC converter operating from the input voltage source 152, a second transformer connected to the input voltage source 152 in parallel with the main transformer 158, or an independent AC-to-DC converter operating from utility line power. Any desired converter configuration can function as the voltage source 200 to supply the bias voltage $V_b$ from the source voltage $V_{in}$. For example, a simple fly-back or forward converter as shown generally at 230 in FIG. 7 may be used. The circuit 230 is a simple isolated DC-to-DC converter operating from the input voltage $V_{in}$. The inverter includes a transformer 232 with a primary winding 234 and a secondary winding 236. The primary winding 234 is connected to the output of a converter bridge 238 which receives its input voltage from the input voltage source 152. The bridge 238 includes a pair of switches 240 and 241 and a pair of diodes 242 and 243. The output side 244 of the converter 230 includes a first diode 246, a second diode 248, an inductor 250 and a capacitor 252. The switches 240 and 241 may be transistor switches of standard design (e.g., IGBTs, BJTs, power MOSFETs, etc.). The switches 240 and 241 may be controlled by any conventional analog or digital based switch controller system 254.

The simple DC-to-DC converter circuit 230 operates as follows. When the switches 240 and 241 are closed, the input voltage $V_{in}$ is applied across the primary winding 234 of the transformer 232, and a voltage, related to $V_{in}$ by the turns ratio of the transformer 232, appears on the secondary winding 236 of the transformer 232. The diode 246 is forward biased, and current flows through the inductor 250 to charge the capacitor 252 across which the bias voltage $V_b$ is provided. When the primary side switches 240 and 241 are opened, the current in the inductive primary winding 234 cannot change instantly; therefore, a freewheeling current is allowed to find a path through the diodes 242 and 243 until dissipated. Opening the switches 240 and 241 also removes the input voltage $V_{in}$ from the primary winding of the transformer 232, and, therefore, the voltage from the secondary winding 236 of the transformer 232. The diode 246 becomes reverse biased. However, the energy stored in the inductor 250 continues to produce a current which returns to the inductor through the diode 248. The magnitude of the output voltage $V_b$ with respect to the input voltage $V_{in}$ depends on the turns ratio of the transformer 232 and the relative on and off times of the converter bridge 238, i.e., the duty cycle of the bridge 238. The duty cycle of the bridge 238 is varied by the controller 254 to regulate the output voltage $V_b$. The bias voltage $V_b$ may also be provided using other isolated or non-isolated DC-to-DC converter designs operating from the input voltage $V_{in}$.

An alternative approach to providing the bias voltage $V_b$ is to use a second transformer connected to the input voltage source 152 in parallel with the main transformer 158 to generate a fixed voltage $V_b$ which is proportional to $V_{in}$ based on the turns ratio of the transformer. However, such a configuration generally will not work as well as a controlled DC-to-DC converter for providing the bias voltage $V_b$. This alternative configuration would provide soft commutation of the output side diodes, but would not provide for optimum timing. The use of a second transformer would, however, be lower in cost than using a separate DC-to-DC converter to provide the bias voltage $V_b$.

The bias voltage $V_b$ may also be provided using an independent AC-to-DC converter operating off of AC power from utility power lines (as shown in FIGS. 5 and 6). This approach is, however, likely to be the most expensive method of providing the bias voltage $V_b$. The choice of how the bias voltage $V_b$ is to be provided may ultimately be determined based on a trade-off between cost and the impact of the chosen topology on the high current switching behavior.

The transformer 158 used in the converter circuit 50 is preferably a co-axial winding transformer (CWT), with an effective turns ratio of $a=n_s/n_p$. The use of a CWT allows the secondary side leakage inductance $L_{lk}$ to be minimized, and allows for control of the primary side leakage inductances $L_{p1}$ and $L_{p2}$. The transformer 158 preferably has a single turn tubular secondary 202. A preferred physical construction of the transformer 158 for high current outputs is described in more detail below.

A switching sequence for the DC-to-DC converter circuit 120, which makes use of the bias voltage 200 for commutation of the output side diodes 204 and 206, may be implemented as a simple modification of the switching sequence described above. The switches 140 and 142, hereafter referred to as switches $S_1$ and $S_4$, of the first converter bridge 126 are gated on to start the power delivery cycle. At the appropriate time, as required for the proper output voltage regulation, the switches $S_1$ and $S_4$ are turned off, and the switch 141, hereafter switch $S_2$, is gated on to connect the bias voltage $V_b$ into the converter bridge 126 to allow a reversal of current in the first converter bridge 126 and subsequent commutation of the output side diode 206, hereafter diode $D_{s2}$. Switches 143 and 144, hereafter switches $S_6$ and $S_7$, are then turned on to connect the input voltage $V_{in}$ to the transformer 158 through the second converter bridge 128. Switch $S_2$ is turned off following a delay after switches $S_6$ and $S_7$ are turned on. The cycle is then repeated for the turn-off of the second converter bridge 128 and turn-on of the first converter bridge 126, with the switch 145, hereafter switch $S_8$, in the second converter bridge 128, acting in the same role as the switch $S_2$ in the first converter bridge 126 to connect the bias voltage $V_b$ into the second converter bridge 128. The output voltage $V_o$ is regulated by the period for which the switches $S_1$, $S_4$ and $S_6$, $S_7$ are on. The duty cycle on the output is thereby controlled to control the output current using well-known principles.

Figure 8:
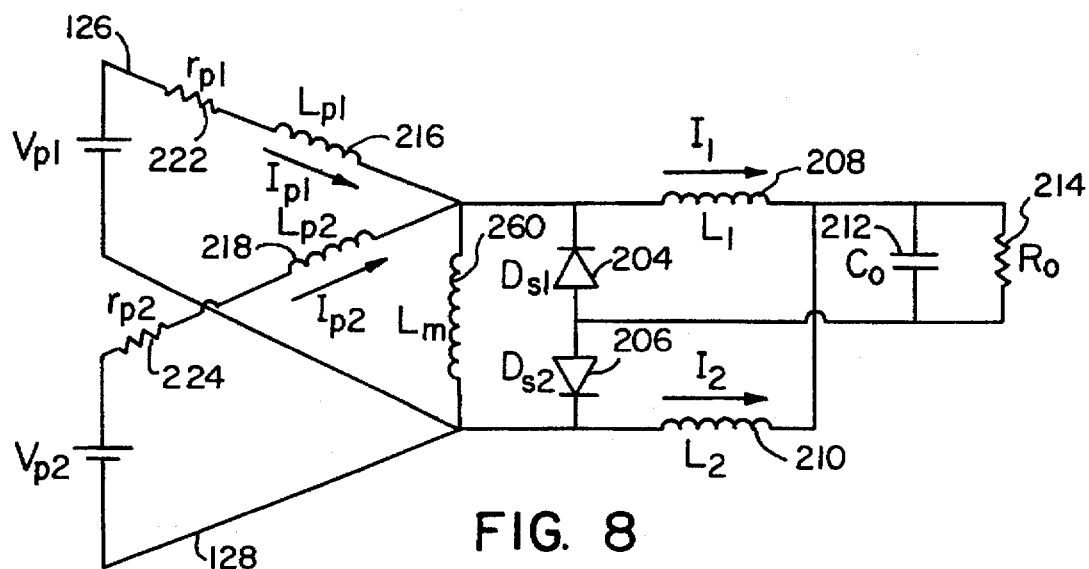
FIG. 8 is an equivalent circuit diagram of the DC-to-DC converter shown in FIG. 4 for illustrating the operation of the circuit.

A more detailed description of the operation of circuit 120 is provided with reference to FIG. 8, which shows an equivalent circuit for the DC-to-DC converter circuit 120 of FIG. 4, and with reference to FIGS. 9–15, showing equivalent circuits for the DC-to-DC converter circuit 120 during various modes of operation of the circuit. Since the circuits of FIG. 4 and FIGS. 8–15 are equivalents, the equivalent circuit elements are labelled with the same reference numerals in each of these figures. Note that in FIG. 8 the transformer 158 is represented by the mutual inductance 260. FIG. 16 is a timing diagram which shows the gate drive signals which are applied to the primary side switches 140–145 during the various modes of operation which are illustrated in FIGS. 9–15.

Figure 9:
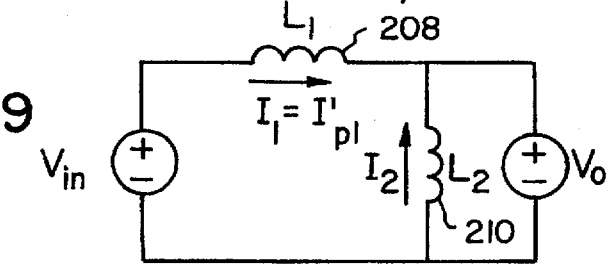
FIGS. 9–15 are schematic circuit diagrams of equivalent circuits of the DC-to-DC converter shown in FIG. 4 operating in various switching modes for illustrating the operation of the circuit.
Figure 10:
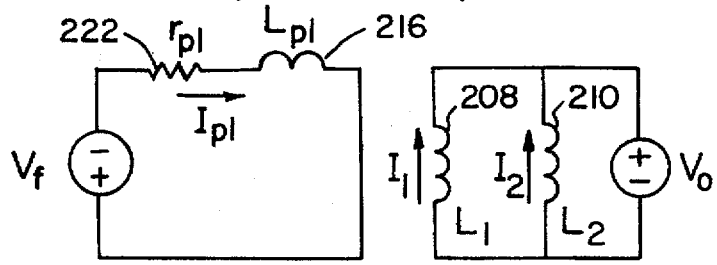

In a first mode of operation, $M_1$, it is assumed that the first bridge 126 is switched on. Thus, switches $S_1$ and $S_4$ are on, and the equivalent circuit of the circuit 120 is as shown in FIG. 9. The voltage across the primary winding 154, $V_{p1}$, is equal to the input voltage $V_{in}$. The voltage appearing across the output side inductors 208 and 210 is, therefore, $aV_{in}$, where a is the turns ratio of the transformer 158. The current through the output side inductor 208, $I_1$, is $I'_{p1}$, where the prime indicates that $I'_{p1}$ is directly related to the current in the primary winding 154, $I_{p1}$. The primary current $I_{p1}$, which follows the secondary current $I_1$, ramps up in a linear fashion during this mode of operation. The output side diode 204, hereafter diode $D_{s1}$ is off, and the combined output side current, $I_1+I_2$, flows through the other output side diode $D_{s2}$.

To initiate the turn-off of the first bridge 126, the switch $S_4$ is turned off. This results in the equivalent circuit of FIG. 10. The current in the primary leakage inductance $L_{p1}$ forces the diode 143, hereafter diode $D_3$, to conduct. Switch $S_1$ is still conducting to complete the free wheel current loop. At this point, the voltage $V_{p1}$ is determined by going around the loop consisting of diode $D_3$ and switch $S_1$, thus, $V_f = V_{s1} + V_{D3}$. $V_f$ is applied across $L_{p1}$, $r_{p1}$, and the output side circuit 124. The parasitic voltage drops across $S_1$ and $D_3$ cause the current $I_{p1}$ to decrease during this mode of operation, $M_2$. As $I_{p1}$ starts decreasing, the current in the secondary winding 202 of the transformer 158 starts decreasing, and the diode $D_{s1}$ is forced to conduct the current $I_1 - I'_{p1}$. Thus, when $I_{p1}=0$, both output side diodes, $D_{s1}$ and $D_{s2}$, are forward biased, conducting freewheeling currents $I_1$ and $I_2$, respectively.

Figure 11:
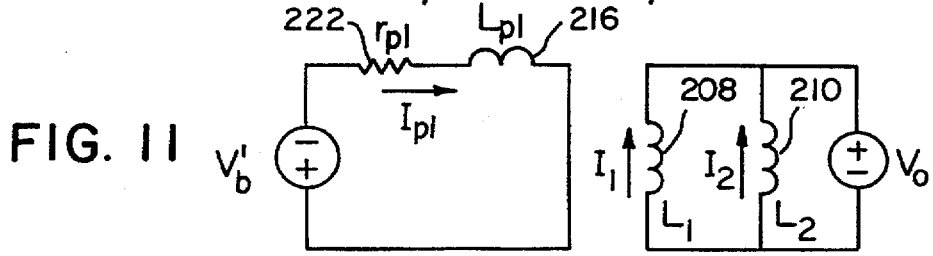

Operating mode $M_3$, shown by the equivalent circuit of FIG. 11, is initiated with the turn off of switch $S_1$. This forces the diode 146 associated with the switch $S_2$, hereafter diode $D_2$, into conduction. The remaining primary side current thus flows through diodes $D_2$ and $D_3$. As a result, a voltage of approximately $V_b' = V_b + V_{in}$ is applied across the primary winding 154. This large voltage applied in opposition to the current flow rapidly drives the current $I_{p1}$ to zero. For the time being, the output side diodes $D_{s1}$ and $D_{s2}$ remain on and conducting. With diode $D_2$ conducting, the switch $S_2$ can be turned on under zero voltage conditions.

Figure 12:
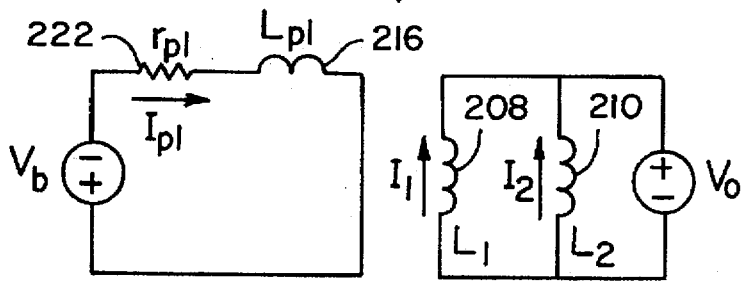

With $S_2$ turned on, the circuit enters made $M_4$ as shown by the equivalent circuit of FIG. 12. The bias voltage $V_b$ is thus connected across the primary winding 154. The primary winding current $I_p$, thus reverses direction. The current $I_p$ is now flowing through the switch $S_2$ and the diode 146 associated with switch $S_4$, hereafter, diode $D_4$. Both $D_{s1}$ and $D_{s2}$ are still conducting at this point but, as the primary side current $I_{p1}$ increases in the negative direction, output side current is forced out of diode $D_{s2}$ and into diode $D_{s1}$. Thus, the current through diode $D_{s2}$ decreases while the current through diode $D_{s1}$ increases.

Figure 13:
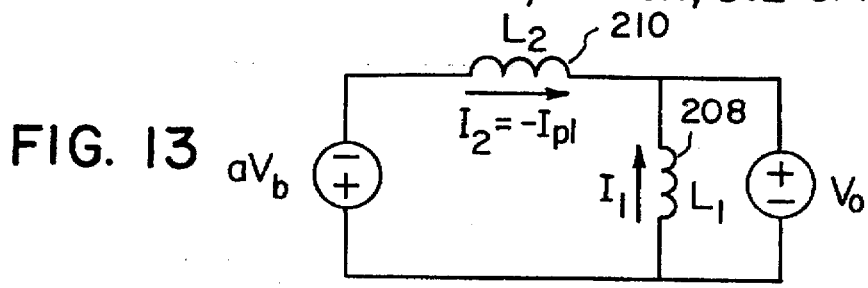

Operating mode $M_5$, shown by the equivalent circuit of FIG. 13, is initiated when the primary side current $I_{p1}$, as reflected in the current $-\Gamma_{p1}$ in the secondary winding 202, reaches the level of the secondary current $I_2$. The secondary current $I_2$ is thus conducted solely through the secondary winding 202, and the output side diode $D_{s2}$ is commutated off. Note that since the voltage driving the primary winding is the bias voltage $V_b$, which is nominally set to be $\leq 0.5^*V_{in}$, any resulting voltage spike on the secondary side 124 resulting from the turn-off of $D_{s2}$ will be $\leq aV_{in}$, where a is the secondary to primary turns ratio. Since the secondary diodes have a minimum voltage rating of $a^*V_{in}$, and since any secondary voltage spike will be within $a^*V_{in}$, no voltage derating is required for the diodes $D_{s1}$ and $D_{s2}$. With conventional hard switching topologies, the voltage spike across the secondary diodes $D_{s1}$ and $D_{s2}$ will be twice the applied voltage, which requires a two per unit derating for these diodes. This poses a problem, especially when Shottky diodes are used, since high voltage Shottky diodes are not widely available. The converter 120 of the preset invention avoids this problem and hence utilizes the output side diodes more efficiently.

Figure 14:
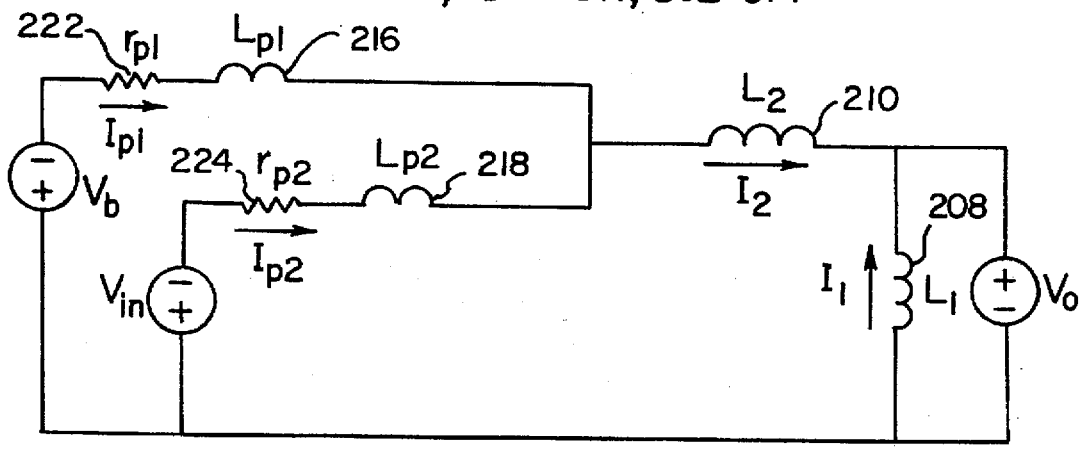

In mode $M_6$, shown by the equivalent circuit of FIG. 14, the second converter bridge 128 is safely switched on, as the current through diode $D_{s2}$ has been reduced to zero. The input voltage $V_{in}$ is impressed across the transformer primary 156 which forces the current $I_{p1}$ in the first converter bridge 126 back to zero. At this point it is important to ensure that diode $D_{s2}$, which is now off, does not take up any current as the second bridge 128, comprising switches $S_6$ and $S_7$, picks up current. To ensure this, switches $S_2$ and diode $D_4$ are allowed to conduct for a small defined overlap time before they are turned off. This delay also allows the current $I_{p1}$ to decay to zero, and allows $S_2$ to be switched at zero current. This overlap time is preferably on the order of 1-2 microseconds. The overlap allows the current in the second primary winding 156, $I_{p2}$, which will be a negative current, to equal $-I_2$ before switch $S_2$ and diode $D_4$ are turned off. Turning the switch $S_2$ off after the time delay, and the switch $S_4$ off along with the turn on of switches $S_6$ and $S_7$ will reduce any current spike. In any case, a current spike occurring at bridge turn-on is not problematic. The turn-on losses in both bridges 126 and 128 are limited by the transformer leakage inductances $L_{p1}$ and $L_{p2}$. During the overlap, the current through the output side inductor $L_1$ continues to be $I_1$ which is conducted through the diode $D_{s1}$. Diode $D_{s2}$ continues to be reverse biased with the current $I_2$ through the inductor $L_2$ provided through the secondary winding 202 and proportional to the combined primary winding currents $I_{p1}$ and $I_{p2}$.

Figure 15:
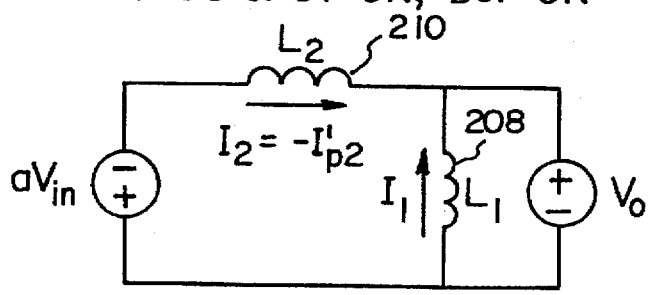
Figure 16:
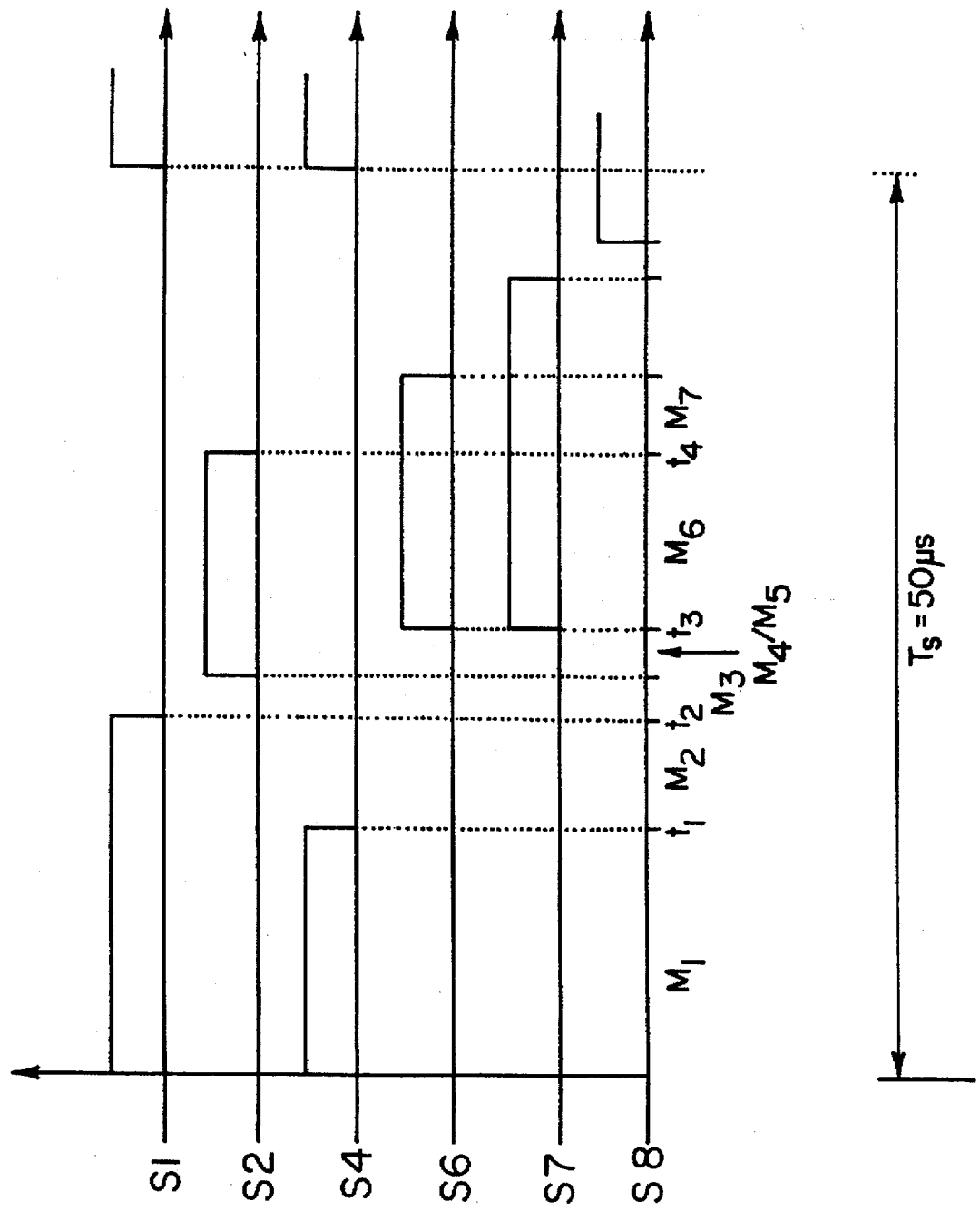
FIG. 16 is an illustrative timing diagram of the gate drive signals for the primary side converter switches of the DC-to-DC converter of the present invention for implementing the switching modes illustrated in FIGS. 9–15.

Finally, mode $M_7$, as shown by the equivalent circuit of FIG. 15, is achieved when the switch $S_2$ is opened, entirely removing the first bridge 126 from the circuit. A voltage proportional to $V_{in}$ now appears at the secondary winding 202. This voltage maintains diode $D_{s1}$ forward biased and diode $D_{s2}$ reverse biased. Inductor $L_1$ conducts current $I_1$ through forward biased diode $D_{s1}$. Inductor $L_2$ conducts current $I_2$, which is proportional to the primary winding current $I_{p2}$ and which is a negative value current. The cycle described above is then repeated for the commutation of diode $D_{s1}$ after the turn-off of the second bridge 128 and before the turn-on of the first bridge 126. The switching sequence for the negative half cycle is essentially the same as the switching sequence for the positive half cycle. For the negative half cycle, switch $S_8$ of the second bridge 128 plays the same role as switch $S_2$ of the first bridge 126. It is apparent that mode $M_7$ shown in FIG. 15 is functionally equivalent to mode $M_1$ shown in FIG. 9. The total cycle period may be, for example, approximately 50 μs, corresponding to a switching frequency of 20 kHz.

Variations on the switching sequence just described may also be employed in accordance with the present invention. For example, in switching off the first input side converter 122, switch $S_1$ may be opened before or simultaneously with switch $S_4$. However, the switching sequence described allows for better control of the output voltage and conforms with pulse width modulated (PWM) control schemes. As can be seen, the time between the turn off of the first converter bridge 126 and the turn on of the second converter bridge 128 is characterized by a free wheeling mode on the primary side. This period may be varied to vary the pulse width of the converter 120 to adjust the output voltage.

A simulation of the DC-to-DC converter circuit 120 of the present invention was performed using the simulation program SABER. The transformer models employed included leakage and magnetizing inductances and loss resistances. The switching elements were modeled using detailed IGBT models, including capacitances, and forward drop and turn-off tail behavior. The diode models were also detailed models, including forward and reverse recovery characteristics, and capacitance. Selected simulation parameters are shown in Table 1.

TABLE 1

| Simulation Parameters | |
|---|---|
| Inductances | $L_p = 15$ μH, $L_g = 4$ μH, $L_{lk} = 10$ nH |
| Capacitances (Parasitic) | $C_g = C_D = 1$ nF |
| Transformer | $n_p = 10$, $n_g = 1$ |
| Voltages | $V_{in} = 620$ V, $V_b = 160$ V |
| Currents | $I_o = I_1 + I_2 = 1$ kA |

Figure 17:
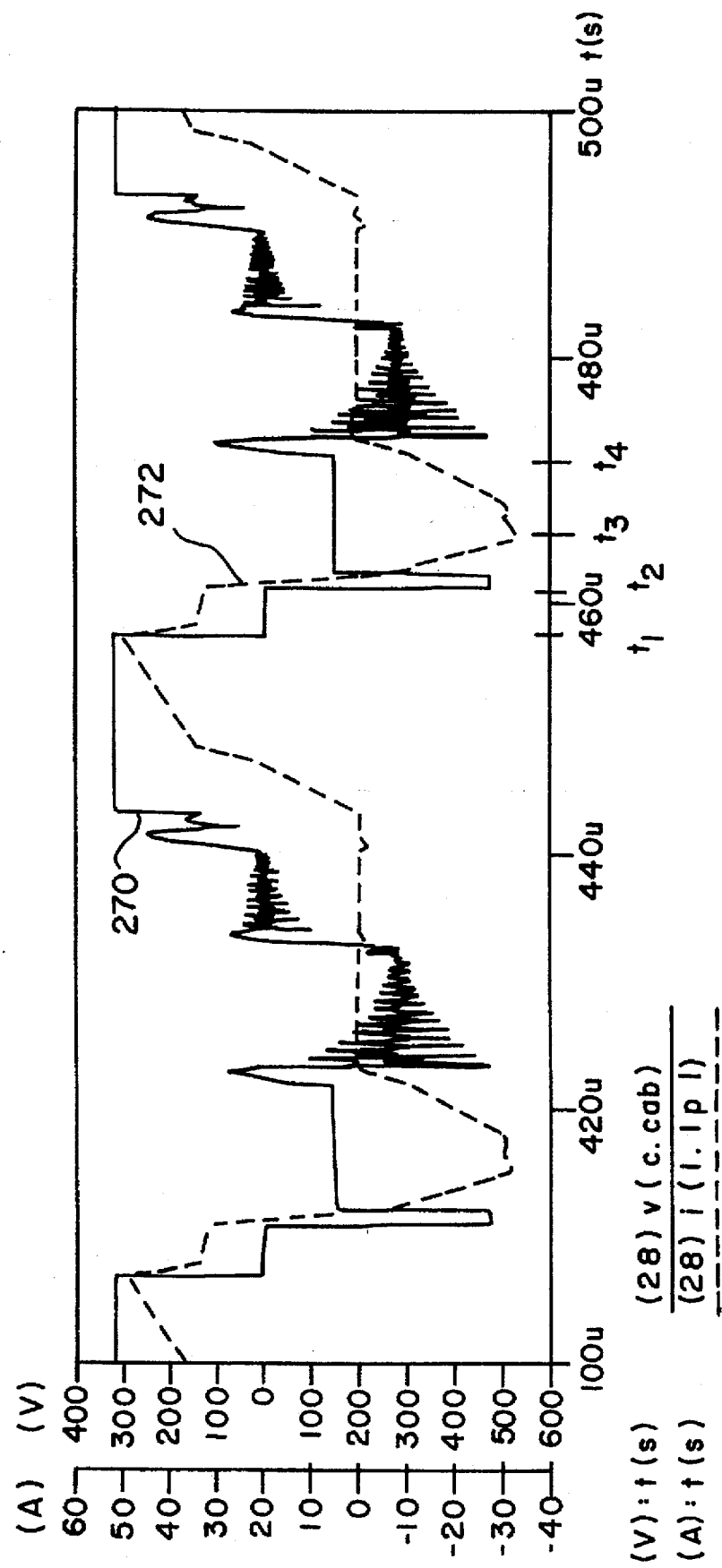
FIG. 17 is a graph of simulated voltage and current waveforms in one of the primary side windings of the DC-to-DC converter of the present invention.
Figure 18:
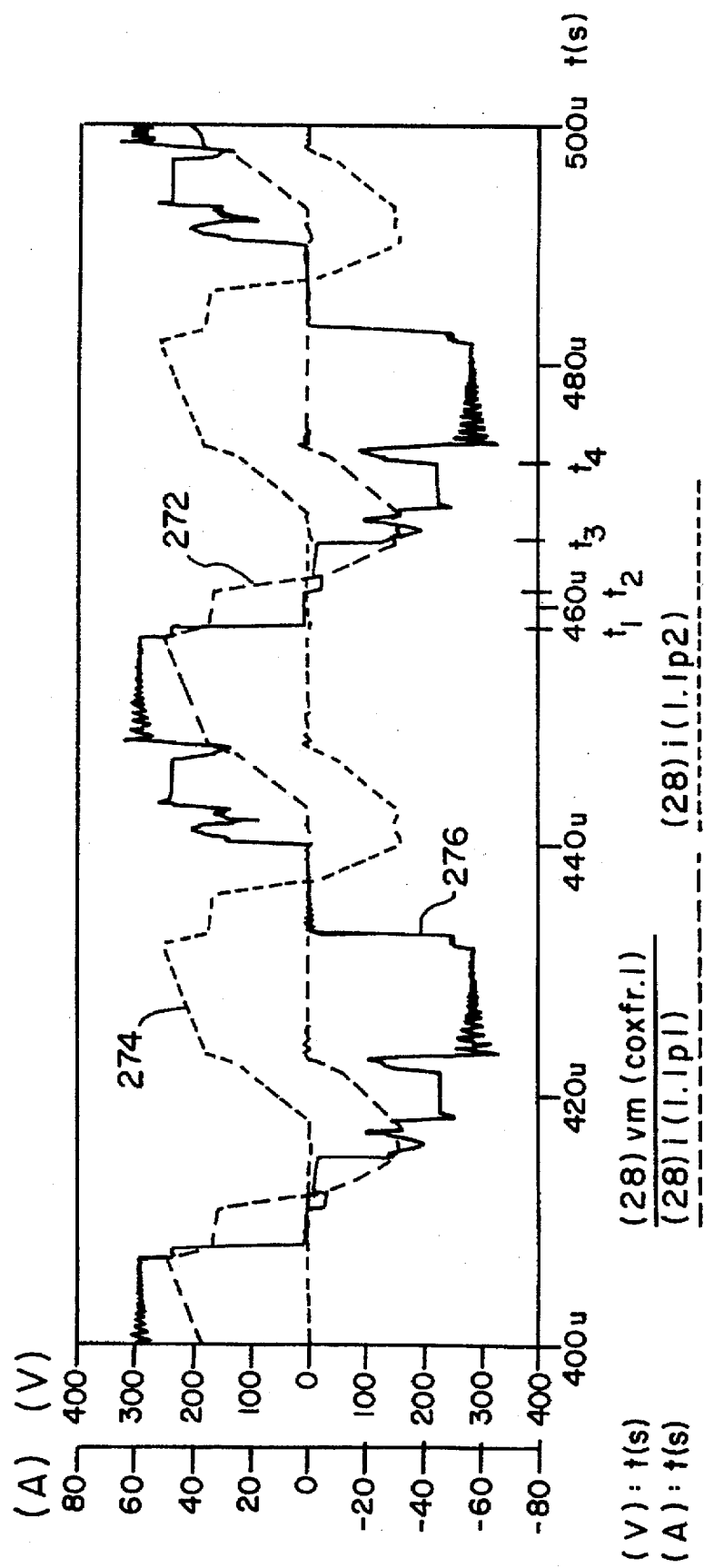
FIG. 18 is a graph of simulated voltage and current waveforms in the primary side of the DC-to-DC converter of the present invention.
Figure 19:
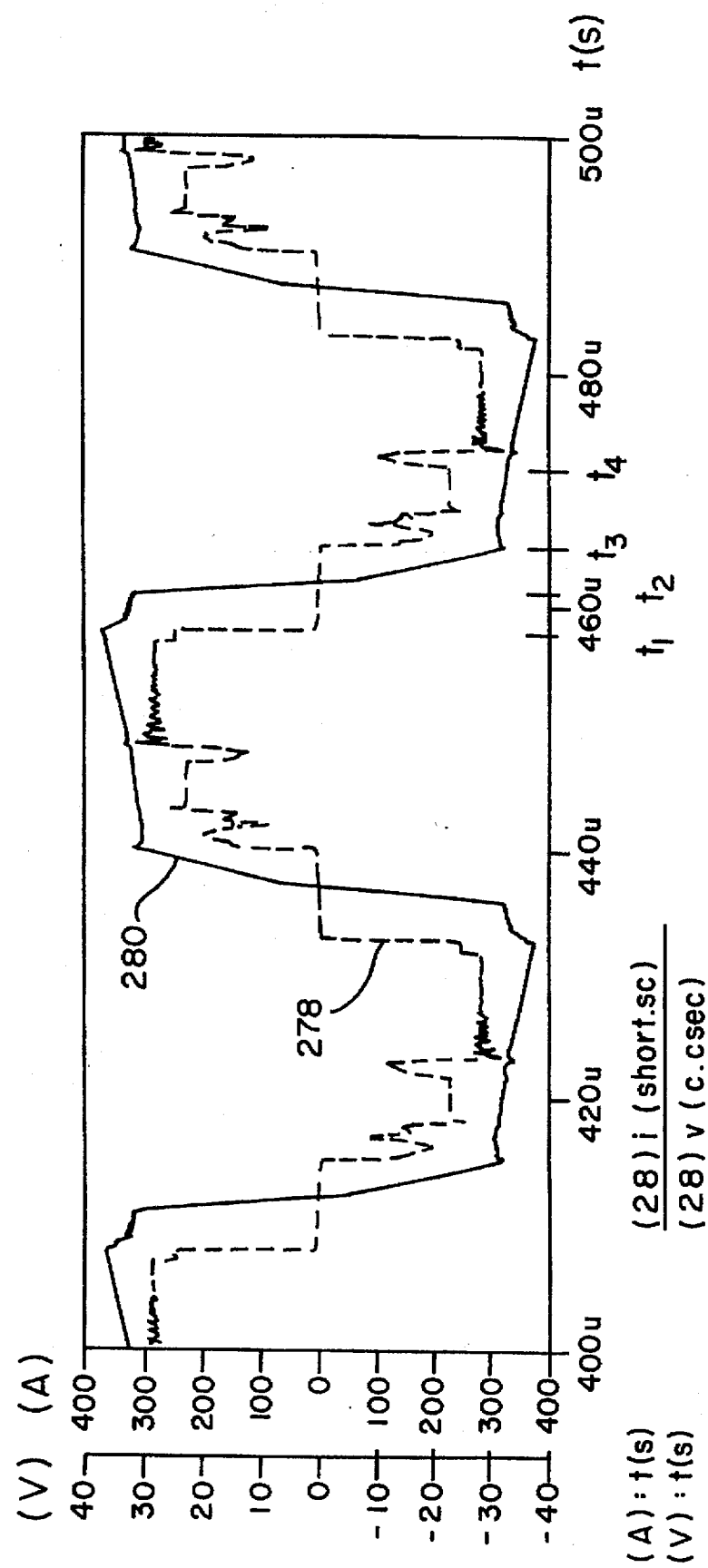
FIG. 19 is a graph of simulated voltage and current waveforms in the secondary side winding of the DC-to-DC converter of the present invention.
Figure 20:
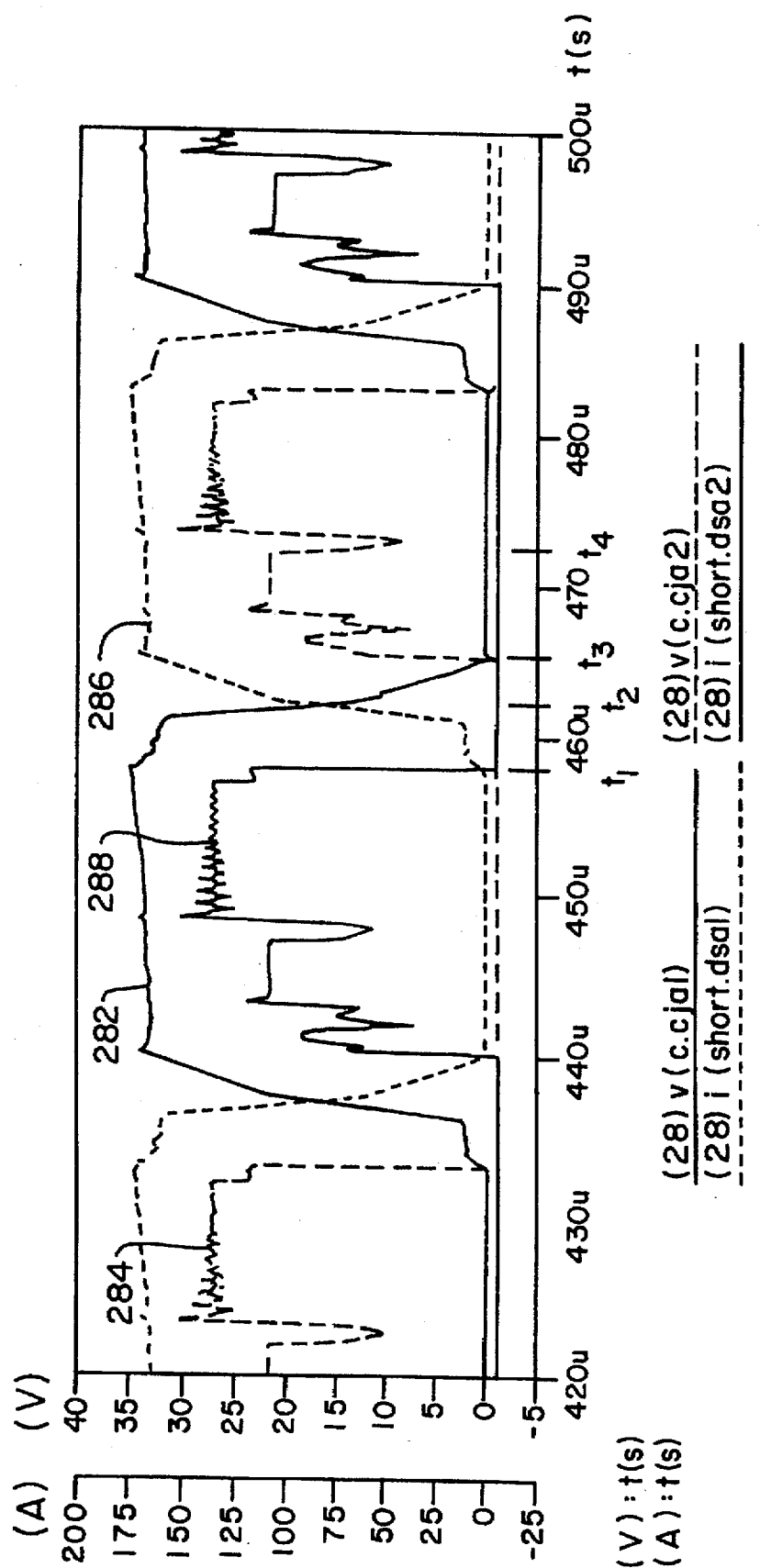
FIG. 20 is a graph of simulated voltage and current waveforms in the output side diodes of the DC-to-DC converter of the present invention.

Simulation results for the circuit 120 are shown in FIGS. 17–20. FIG. 17 shows simulated voltage and current waveforms for the first primary winding 154. Waveform 270 represents the voltage across the primary winding 154, and waveform 272 represents the current through the primary winding 154. FIG. 18 shows the current waveform 272 through the first primary winding 154, along with the current waveform 274 through the second primary winding 156 and the waveform of the total voltage 276 across the primary of the transformer 158. FIG. 19 shows simulated voltage and current waveforms for the secondary winding 202. Waveform 278 represents the voltage across the secondary winding 202, and waveform 280 represents the current through the secondary winding 202. FIG. 20 shows simulated voltage and current waveforms for the output side circuit 124. Waveform 282 represents the current through the diode $D_{s2}$ with waveform 284 representing the reverse biased, cathode to anode, voltage across the diode $D_{s2}$. Similarly, waveform 286 represents the current through diode $D_{s1}$, with waveform 288 representing the reverse biased voltage across the diode $D_{s1}$.

As can be seen from FIGS. 17–20, prior to time $t_1$ the first converter bridge 126 is on, and the full input voltage $V_{in}$ appears across the primary winding 154. The current 272 through the primary winding 154 is at a high level. A positively oriented voltage 278, thus appears on the secondary winding 202, and a large positively directed current 280 flows through the secondary winding 202. During this time, the large voltage level 288 appearing across diode $D_{s1}$ reverse biases the diode, so that the current 286 through the diode $D_{s1}$ is zero. However, the current 282 through diode $D_{s1}$ is large, with the voltage 284 across the diode $D_{s2}$ at the low forward conducting voltage drop level.

At time $t_1$, switch $S_4$ is turned off, causing the input voltage 270 to disappear from across the primary winding. The current 272 through the primary winding freewheels in the converter circuit 126 and begins to decline. The voltage 278 appearing on the secondary winding 202 also disappears. The current 280 through the secondary winding 202 begins to decline along with the current 282 through diode $D_{s2}$. Simultaneously, the voltage 288 across $D_{s1}$ disappears as diode $D_{s1}$ turns on and begins to conduct current 286.

At time $t_2$, switch S1 is turned off. This causes a large negative voltage 270 ($V_{in}+V_b$) to appear across the primary winding 202. This drives the primary current 272 rapidly to zero. Shortly thereafter, switch $S_2$ is turned on, and the voltage 270 across the primary winding 154 settles at the negative bias voltage level $-V_b$. The current 272 in the primary winding 154 then begins to reverse direction. During this period, the current 282 through diode $D_{s1}$ rapidly declines as the current 286 through diode $D_{s1}$ increases.

At time $t_3$, the current 282 through diode $D_2$ drops to zero, diode $D_{s2}$ is thus commutated off with the voltage 284 appearing across the diode $D_{s2}$. Thereafter, the switches in the second primary converter 128 may be turned on. This causes the current 274 in the primary winding 156 to begin to build up as the voltage 276 is applied across the primary winding 156. Thereafter, at time $t_4$, switch S2 in the first primary side converter 126 may be turned off. The current 272 in the first primary winding 154 is thus brought to zero, and, as described above, a voltage spike may appear on the first primary winding 154. The switching sequence is then repeated, with similar results, for the negative half of the cycle, by opening and closing the corresponding switches in the second converter bridge 128.

Figure 21A:
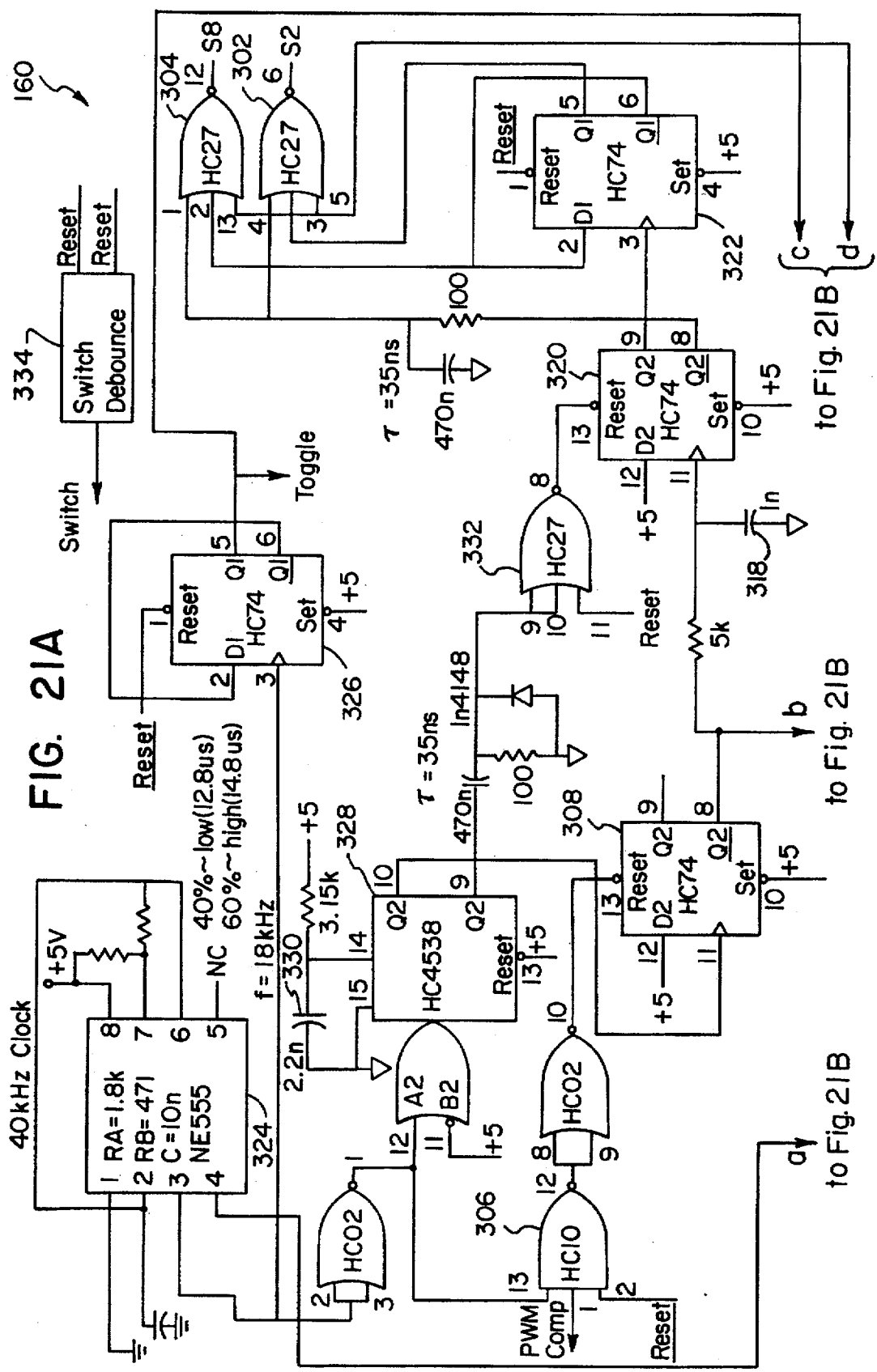
FIG. 21 is a schematic circuit diagram of an exemplary switch controller for the DC-to-DC converter of the present invention.
Figure 21B:
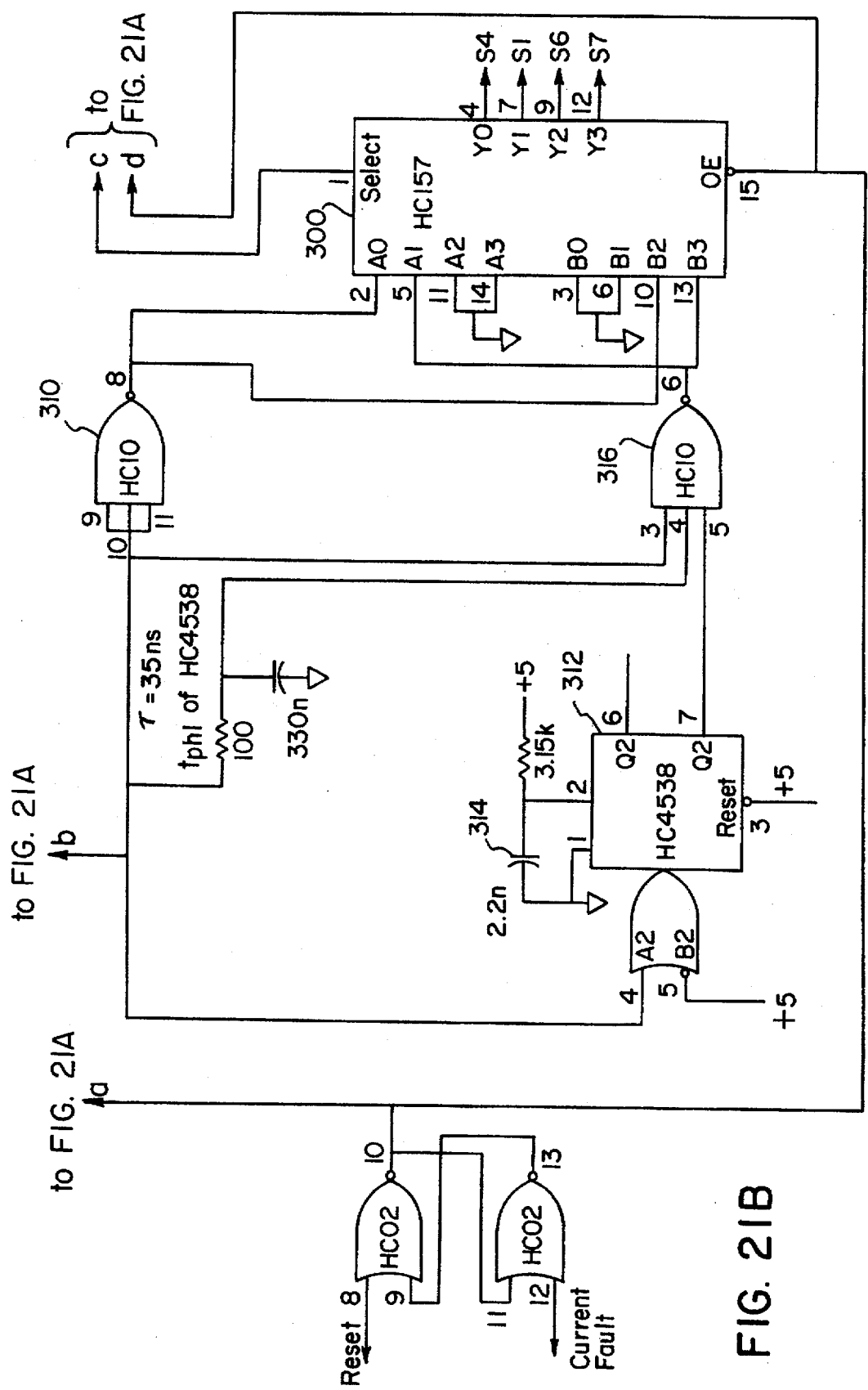

An exemplary controller circuit 160 for implementing the switching sequence of the gate drive signals shown in the timing diagram of FIG. 16 is shown in FIG. 21. Other control circuits may also be employed to implement the gate drive signal switching sequence. These may include control circuits employing digital processors, in whole or in part, to generate control signal timing and delay functions. Also, variations on this or other control circuits may be used to implement variations on the switching sequence previously described. The control circuit shown in FIG. 21 may be built using off the shelf components. The main components of the circuit 160 are latches and delay circuits used to realize the proper switching sequence. The operation of the circuit 160 to generate the switching sequence shown in the timing diagram of FIG. 16 is described briefly as follows.

The operation of the control circuit 160 may best be described by assuming an initial circuit state wherein control signals are being provided to the input side switches of the converter 120 such that switches $S_1$ and $S_4$ are on and conducting, and the remainder of the switches are turned off. Thus, the outputs $Y_0$ and $Y_1$ of multiplexer 300, which provide control signals to switches $S_4$ and $S_1$, respectively, are HIGH. (Note that conventional gate drive circuits may be employed to drive the converter switches based on the control signals provided by the controller circuit 160.) The SELECT input to the multiplexer 300 is LOW, selecting multiplexer inputs $A_{0-3}$ to be passed through to the multiplexer outputs $Y_{0-3}$, respectively. Thus, the $A_0$ and $A_1$ inputs to the multiplexer 300 are also HIGH at this time. At this time, the output of NOR gate 302, which provides the control signal to switch $S_2$ is LOW. Since the $A_2$ and $A_3$ inputs to the multiplexer 300 are connected to ground, the $Y_2$ and $Y_3$ outputs of the multiplexer 300, which provide control signals to switches $S_6$ and $S_7$, in the second converter bridge 128, respectively, are also LOW. Also, the output of NOR gate 304, which provides the control signal to switch $S_8$ is LOW.

At time $t_1$, a control signal is received from a pulse width modulator (PWM) at the input to the NAND gate 306. The PWM which provides this signal may be a conventional modulator designed for providing a pulse width modulated signal to drive the input side converter switches at the desired duty cycle. The signal applied to the NAND gate 306 causes the latch 308 to be reset. Thus, the /$Q_2$ output of the latch 308 goes HIGH. This causes the input to the NAND gate 310 to also go HIGH, causing the output of the NAND gate 310 to go LOW. This causes the $A_0$ input to the multiplexer 300 to go LOW, with the $Y_0$ output of the multiplexer 300 following suit. Thus, the application of the PWM signal to the NAND gate 306 causes the control signal to switch $S_4$ to turn off the switch.

The /$Q_2$ output of the latch 308 is also applied to the input of a delay circuit 312. Application of this HIGH signal to the delay circuit 312 first causes the /$Q_2$ output of the delay circuit to go LOW. This prevents switch $S_1$ from being turned off prematurely. After a time delay, defined by the size of the capacitor 314 in the delay circuit 312, the /$Q_2$ output of the delay circuit 312 also goes HIGH. This, in turn, causes all of the inputs to NAND gate 316 to be HIGH, causing the output of NAND gate 316, and the input $A_1$ to the multiplexer 300, to go LOW. This causes the $Y_1$ output of the multiplexer 300 to go LOW, causing switch $S_1$ to be turned off following a selectable delay period after the switch $S_4$ is turned off.

The transition of the /$Q_2$ output of the latch 308 from LOW to HIGH is also applied to a capacitor 318 on the clock input of a latch 320. After a delay, the voltage across the capacitor 318 charges to the HIGH voltage level causing the latch 320 to be clocked. This causes the /$Q_2$ output of the latch 320 to go LOW, thereby enabling the output of the NOR gate 302. Simultaneously, the $Q_2$ output of the latch 320 causes the latch 322 to be clocked. This causes the $Q_1$ output of the latch 322 to go LOW. With all the inputs to the NOR gate 302 LOW, the output of the NOR gate 302 goes HIGH, switching on switch $S_2$. Thus, switch $S_2$ is turned on following a delay from the turn off of switch $S_4$ which is defined by the value of the capacitor 318.

The switching frequency of the controller 160 is defined by the periodic output waveform of a clock 324. At each LOW to HIGH transition of the output waveform of the clock 324, a new half switching cycle is initiated. Thus, at each LOW to HIGH transition of the clock output, the focus switches from the switches in the first input side converter 126 to the switches in the second input side converter 128. The output of the clock 324 clocks the latch 326 which is configured to produce an alternating LOW or HIGH signal at its output $Q_1$ each time it is clocked. When the latch 326 is clocked, in this example, the $Q_1$ output goes HIGH. This signal is applied to the SELECT input of the multiplexer 300, causing the inputs $B_{0-3}$ of the multiplexer 300 to be selected to be applied to the outputs $Y_{0-3}$ of the multiplexer 300. Since, at this point, all of the inputs $B_{0-3}$ of the multiplexer 300 are low, all of the switching signals are low, and switches $S_1$, $S_4$, $S_6$, and $S_7$ remain off, at least momentarily. Note that since the multiplexer inputs $B_{0-1}$ are connected to ground, switches $S_1$ and $S_4$ will remain off throughout this half cycle.

The output signal from the clock 324 is also applied to the delay circuit 328. This causes the output $Q_2$ of the delay circuit 328 to go HIGH, clocking the latch 308. This, in turn, causes the $/Q_2$ output of the latch 308 to go LOW, causing the output of the NAND gates 310 and 316 to go HIGH, causing the $B_2$ and $B_3$ inputs to the multiplexer 300 to go HIGH, causing the $Y_2$ and $Y_3$ outputs of the multiplexer 300 to go HIGH, and thereby turning on switches $S_6$ and $S_7$. After a delay, whose duration is determined by the value of the capacitor 330 in the delay circuit 328, the delay circuit 328 transitions back to its initial state, causing the $/Q_2$ output of the delay circuit 328 to go HIGH. This, in turn, causes the output of the NOR gate 332 to go LOW, resetting the latch 320. Thus, the $/Q_2$ output of the latch 320 goes HIGH, disabling the outputs of the NOR gates 302 and 304, causing the output of NOR gate 302 to go LOW, thereby turning off the switch $S_2$. Thus, switch $S_2$ is turned off following the turn on of switches $S_6$ and $S_7$ after a delay period defined by the capacitor 330 in the delay circuit 328.

The second half of the switching cycle proceeds in the same manner as the first half. A PWM signal applied to the input of the NAND gate 306 causes the latch 308 to be reset. This causes the $/Q_2$ output of the latch 308 to go HIGH, which causes the output of the NAND gate 310 to immediately go LOW, the $B_2$ input to the multiplexer 300 to go LOW, the $Y_2$ output of the multiplexer 300 to go LOW, and the switch $S_6$ to be turned off. After a delay, defined by the capacitor 314 in the delay circuit 312, the output of NAND gate 316 also goes LOW, causing the $B_3$ input to the multiplexer 300 to go LOW, the $Y_2$ output of the multiplexer 300 to go LOW, and the switch $S_7$ to be turned off. Following a delay defined by the value of the capacitor 318, the latch 320 is clocked, causing the output of the NOR gate 304 to be enabled, and clocking the latch 322 which now applies a LOW signal at its $/Q_2$ output to the input of the NOR gate 304, causing the output of the NOR gate 304 to go HIGH and switch $S_8$ to be turned on.

The cycle begins again with the LOW to HIGH transition of the output of the clock 324, which clocks the latch 326 thereby disabling the $B_{0-3}$ inputs of the multiplexer 300 and selecting the $A_{0-3}$ inputs of the multiplexer 300. Thus, the focus is once again returned to the switches in the first converter bridge 126. Note that the controller circuit 160 preferably also includes a debounced reset switch 334 which allows the initial state of the controller 160 to be reset. The function of electrical components in the circuit 160 which are not specifically described herein will be apparent to those skilled in the art.

The embodiment of the DC-to-DC converter circuit of the present invention shown in FIG. 4 includes two converter bridge circuits 126 and 128 connected in parallel with one input supply voltage $V_{in}$ and one negative bias supply voltage $V_b$. For transformers with high primary to secondary turns ratios, i.e., on the order of 20:1, the leakage inductance on the primary side can become quite substantial. In such cases, the bias voltage $V_b$ has to be relatively large to reverse the current in the converter bridges. The bias voltage $V_b$ may need to be up to half of the main DC bus voltage $V_{in}$. For example, with a $V_{in}$ derived from a 460V AC input using an AC-to-DC converter, the DC bus voltage may be on the order of 650–700V DC. Considering this value of $V_{in}$, and a bias voltage $V_b$ of half that amount, peak device stresses in the primary side 122 are approximately 1,000V. This is not a desirable stress voltage for IGBTs rated at, e.g., 1,200V.

Figure 22:
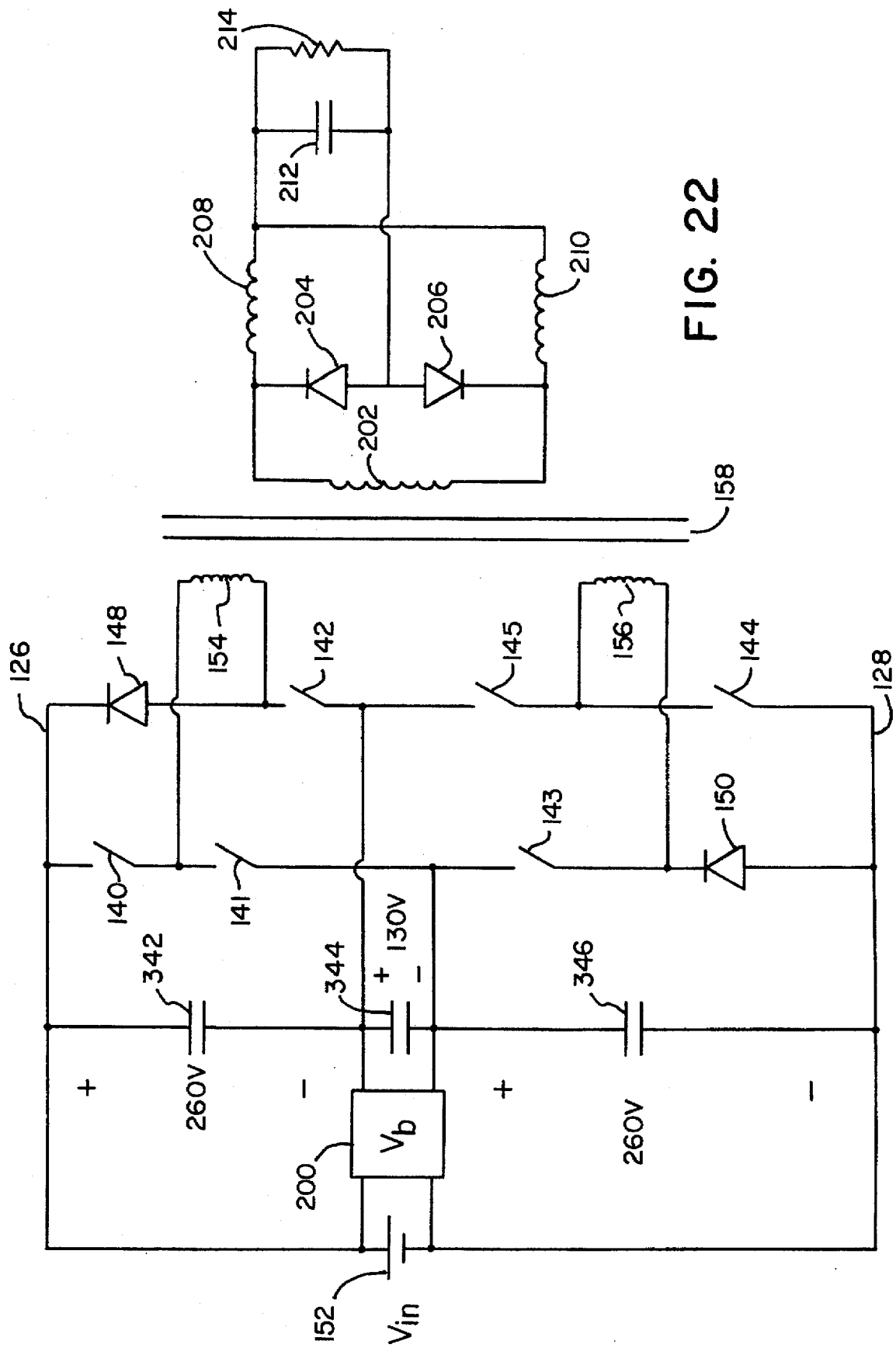
FIG. 22 is a schematic circuit diagram of an alternative embodiment of a DC-to-DC converter for high current outputs in accordance with the present invention, with the primary side converters connected effectively in series.

An alternative approach is to stack the converter bridges in series as shown in the circuit 340 of FIG. 22. The circuit 340 represents an alternative embodiment of the DC-to-DC converter for high current outputs of the present invention. The circuit 340 operates in the same manner as the circuit 120 of FIG. 4, and, therefore, circuit components in FIG. 22 having the same function as those in FIG. 4 are labeled with the same reference numerals. As described earlier, the bias voltage, $V_b$, may be derived from the input voltage $V_{in}$ in a variety of ways, including the use of a simple transformer, or a more complex DC-to-DC converter for better voltage control of $V_{in}$.

In the circuit 340, the DC input voltage $V_{in}$ is divided across each bridge 126 and 128. This reduces the turns ratio across each primary winding 154 and 156. For example, a 650V DC input $V_{in}$ is now split into 260V +130V+260V DC across capacitors 342, 344 and 346, respectively. Therefore, it can be seen that the peak device stress is, in this case, 390V for switching devices 140, 141, 144 and 145; and that the peak device stress is 260V for switching devices 142 and 143 and the two diodes 148 and 150. The 130 volts across capacitor 344 is equivalent to $V_b$. As discussed above, $V_b$ may be provided from a second transformer across $V_{in}$ which maintains a voltage on $V_b$, or could be provided by a DC-to-DC converter for finer control over $V_b$. For some applications, the circuit configuration 340 may present charge balance limitations in the supply of the voltage $V_b$.

Figure 23:
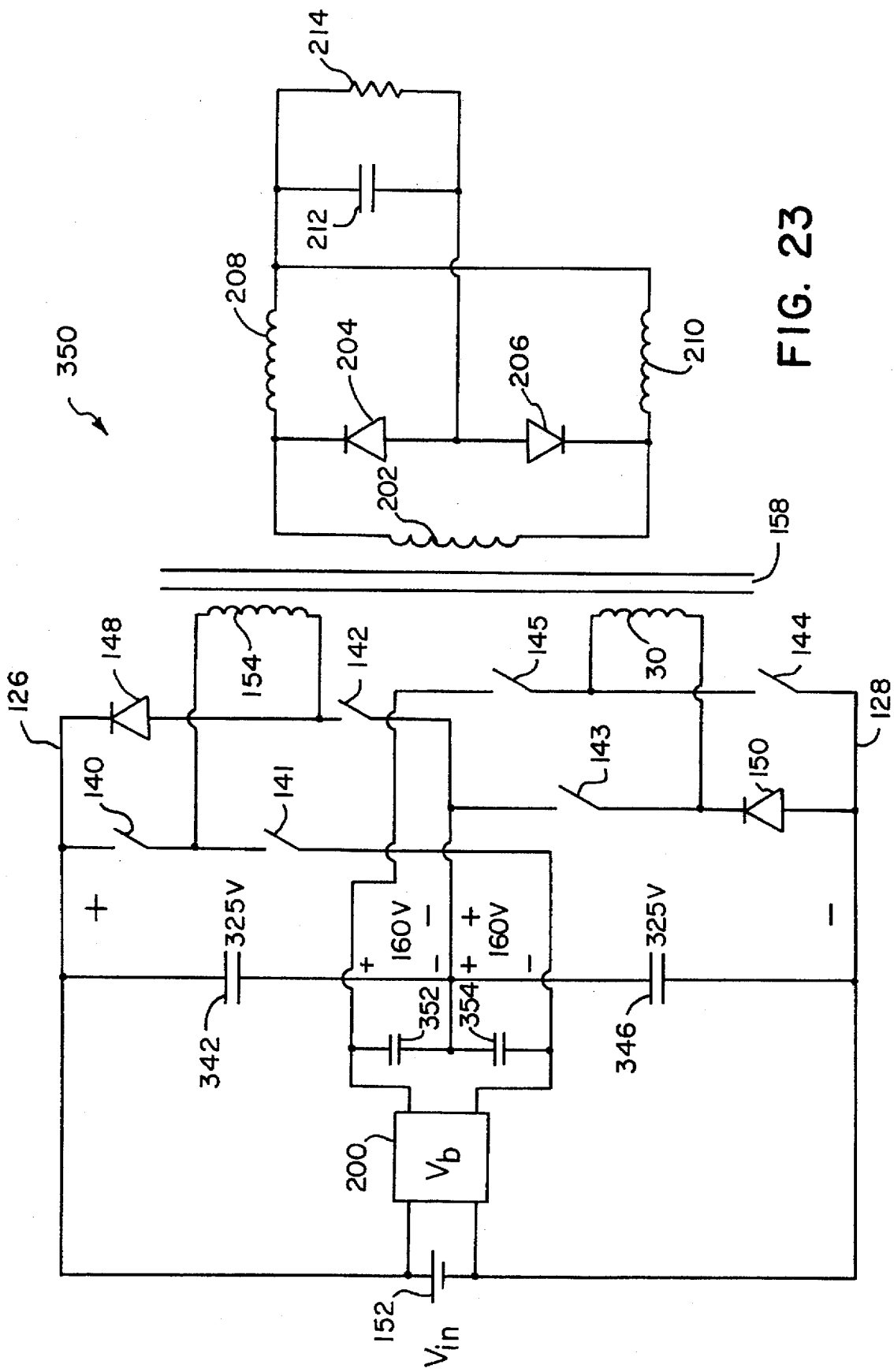
FIG. 23 is a schematic circuit diagram of a further embodiment of the present invention similar to that shown in FIG. 22.

An alternative arrangement of the circuit shown in FIG. 22 is the circuit 350 shown in FIG. 23. The components of circuit 350 are labeled with reference numerals corresponding to the equivalent components of FIG. 22. The circuit 350 provides separate bias voltages $V_b$ across capacitors 352 and 354 for the second and first converter bridges 128 and 126, respectively. Thus, circuit 350 avoids a charge balance problem in the supply of the bias voltage $V_b$. However, the circuit allows peak voltage stresses of up to 485V for a 650V DC input $V_{in}$. This stress level may be too high to allow use of, for example, 600V rated IGBT switching devices in the converter bridges 126 and 128.

Both alternative circuits 340 and 350 allow fairly accurate regulation of the bias voltage $V_b$. The need for a separate DC-to-DC converter to provide the bias voltage $V_b$ may be eliminated in either circuit by using a second transformer connected to the input voltage $V_{in}$ to provide the bias voltage $V_b$. The presence of the capacitors in the circuits 340 and 350 provide desirable snubbing action. Both circuits allow for operation with lower voltage rated switching devices. For low power applications, e.g., with an input voltage $V_{in}$ of less than 230V, MOSFETs may be used for the converter bridge switching devices.

Figure 24:
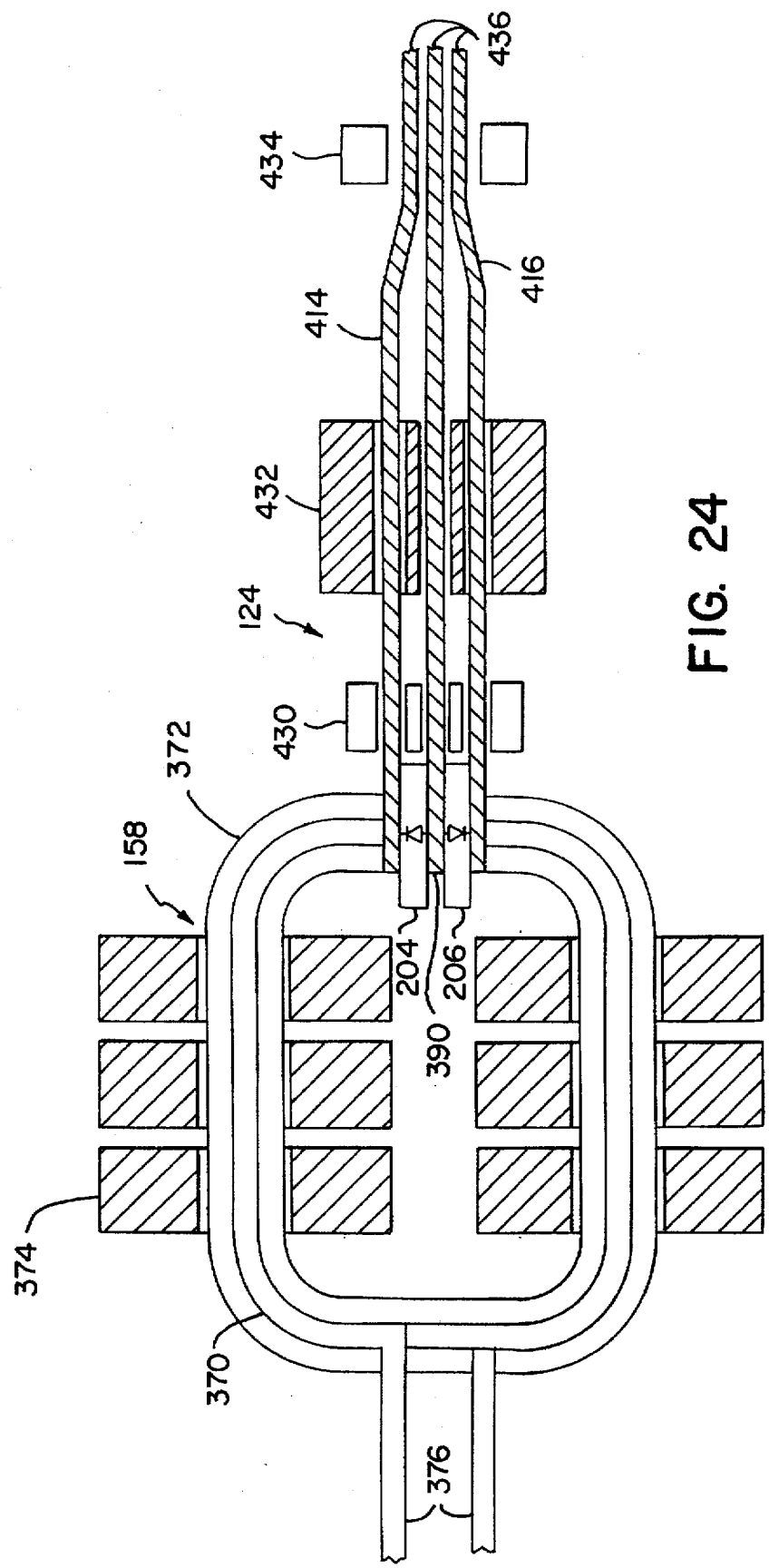
FIG. 24 is an illustrative cross-sectional view of the physical construction of a transformer and output side of a DC-to-DC converter that may be utilized in accordance with the present invention.

For the high current output applications for which the DC-to-DC converter of the present invention is particularly suited, the physical construction of the transformer 158 and the output side circuit 124 is a significant consideration. An illustrative cross-sectional view of a preferred physical construction of the transformer 158 and output side circuit 124 is shown in FIG. 24. The physical structures which are described below can be employed with any of the various circuit embodiments of the present invention described above.

As has already been mentioned, the transformer 158 is preferably a co-axial winding transformer (CWT) as shown. The CWT provides low leakage inductance in the primary windings 370 and allows for a high current density on the transformer secondary 372. The transformer core 374 preferably consists of a split E, C, or cut toroid structure which is assembled around a tube forming the transformer secondary 372. The secondary winding 372 is preferably formed of a copper tube with the primary winding bundles 370 fully enclosed therein. The primary winding bundles 370 may be connected at their ends 376 to the converter bridges 126 and 128 (not shown in FIG. 24). The secondary winding tube 372 can be formed in many different ways. Ideally, as shown in FIG. 24, one can take a copper tube shaped in the form of a U, and work the tube into the desired, basically oval, form. However, for this shape of secondary tube, winding of the primary bundles 370 through the secondary tube 372 may be difficult, especially if the number of primary turns is high.

Figure 25:
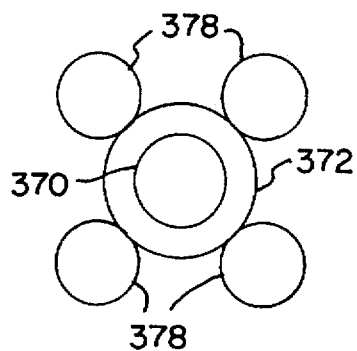
FIG. 25 is an illustrative cross-sectional view of an exemplary symmetrical arrangement of multiple rectifier diodes in the output side of a DC-to-DC converter structure as shown in FIG. 24.
Figure 26:
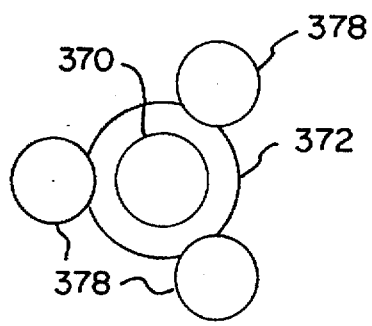
FIG. 26 is an illustrative cross-sectional view of an alternative symmetrical arrangement of multiple rectifier diodes in the output side of a DC-to-DC converter as shown in FIG. 24.

To minimize leakage currents as much as possible, the rectifiers 204 and 206 are preferably inserted as much inside the secondary tube 372 as possible. The physical transformer structure shown in FIG. 24 is particularly suited to this type of arrangement. Two alternative symmetrical arrangements of rectifiers 204 and 206 for high current outputs, implemented as multiple parallel diodes 378, are shown in FIGS. 25 and 26. Multiple parallel diodes are used to provide high current carrying capability and are arranged symmetrically for purposes of even current sharing as described in more detail below. FIG. 25 shows a schematic rectifier configuration including four symmetrically arranged diodes 378 in relation to the secondary tube 372 and primary windings 370. FIG. 26 shows a similar arrangement, including three symmetrically arranged diodes 378. The close and symmetrical relation between the diodes 378 and secondary tube 372 is apparent. The actual physical connection between the ends of the tube 372 and the diode configuration may be by various means, such as soldering. Other preferable diode configurations for the output side circuit 124 of the present invention are described in more detail below.

Figure 27:
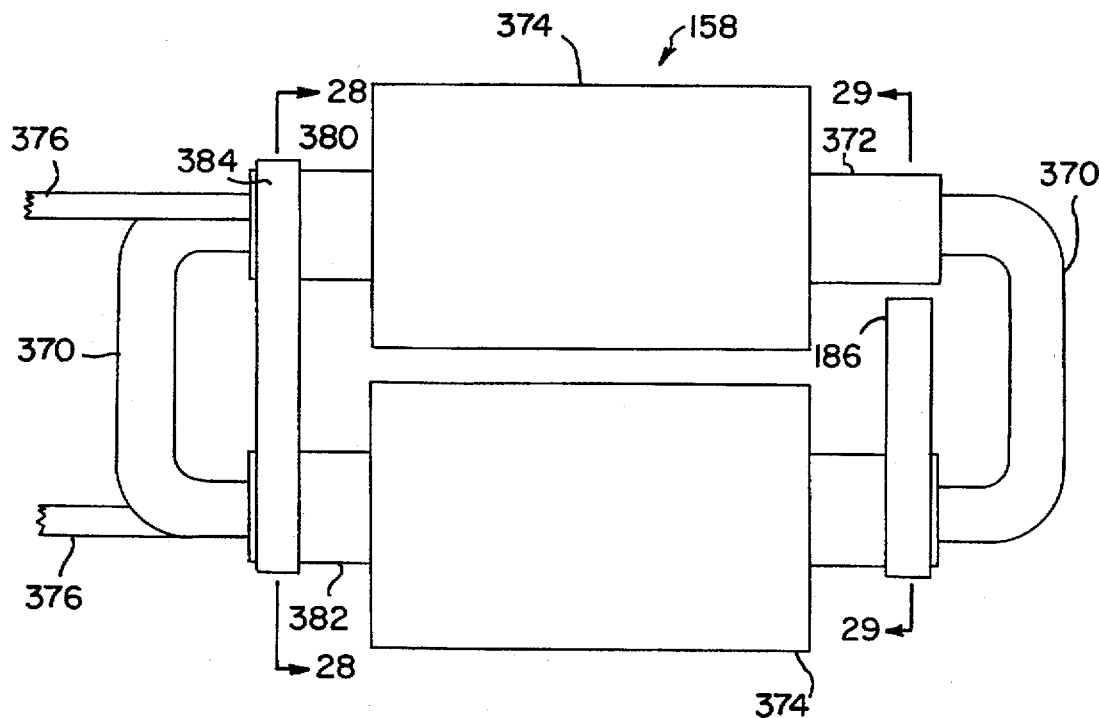
FIG. 27 is an illustrative side view of an alternative transformer configuration for the DC-to-DC converter of the invention.
Figure 28:
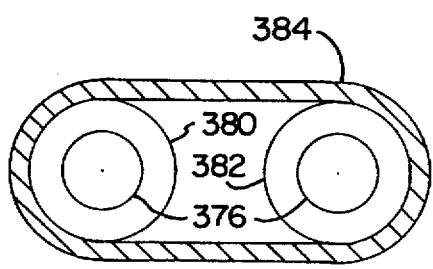
FIG. 28 is an illustrative cross-sectional view of the input end of the alternative transformer configuration of FIG. 27 taken along the line 28—28 of FIG. 27.
Figure 29:
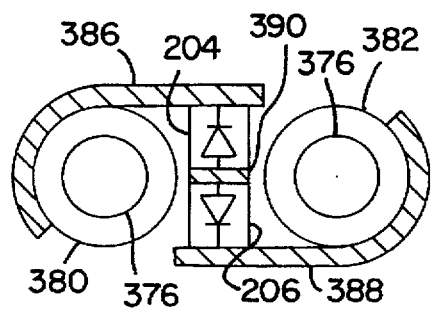
FIG. 29 is an illustrative cross-sectional view of the output end of the alternative transformer configuration of FIG. 27 taken along the line 29—29 of FIG. 27.

An alternative configuration for the construction of the transformer 158 is shown in FIG. 27. Here two straight copper tubes 380 and 382 are used to form the secondary 372. A copper strap 384 is used to complete the secondary winding 372. Cross-sectional views of each end of the transformer 158 are shown in FIG. 28, for the primary end, and, in FIG. 29, for the secondary output end. As shown, the transformer core 374 secondary tube 380 each secondary tube 380 and 382. The primary winding bundles 370 are run through the tubes 380 and 382. In this configuration, the winding of the primary 370 through the secondary 372 is simplified. For small volume runs, the winding can be manually done by threading the primary winding bundles through the tubes 380 and 382. For higher volume runs, the primary winding bundles 370 can be inserted into split secondary tubes 380 and 382, which are then closed and fastened using the copper straps 384, 386, and 388 which are soldered on. As shown in FIG. 29, the alternative approach to the construction of the transformer 158 can also simplify the interface between the secondary tube 372, as constructed of tubes 380 and 382, and the output side rectifier structures 204 and 206. Copper straps 386 and 388 soldered at the output side end of each secondary tube, 380 and 382, respectively, may contain the diode structures 204 and 206 and the common output line or bus bar 390 between them. The connection of the rectifiers 204 and 206 to the secondary 372 and common bus bar 390 will be discussed in more detail below.

A typical CWT in accordance with the present invention will have the following characteristics, as described in Table 2.

TABLE 2

Co-axial Winding Transformer Characteristics

| Converter Rating | 20 V at 2,500 A |
|---|---|
| DC Bus Voltage | 650 V* |
| Primary Voltage | +/−600 V |
| Primary Current | 60 A rms/winding |
| Primary Operating Freq. | 20–25 kHz |
| Secondary Voltage | +/−40 V |
| Secondary Current | 1,250 A |

*Derived from a 460 V three phase AC input using standard AC/DC conversion techniques.

Each primary winding 154 and 156 preferably consists of two litz wire windings of 15 turns each. This means that all turns simultaneously may carry up to 1,800 A. At 300 A/cm$^2$, this gives a copper area enclosed in each secondary tube 380 and 382 of approximately 6 cm$^2$. Assuming a 30% fill factor for the litz wire employed for the primary windings, this gives approximately 20 cm$^2$ total cross-sectional area for the interiors of the two tubes 380 and 382. The secondary copper tube must thus have a radius r determined by $\pi r^2 = 20$ cm$^2$, giving r=2.52 cm (approximately 1 inch). The tube circumference is thus $2\pi r = 15.8$ cm. Assuming a copper tube skin depth of 2 mm at 20 kHz frequency gives a secondary side current density in the copper of $J_{sec} = 1,250$ A/(15.8 cm, 0.2 cm)=395 A/cm$^2$. Given that the copper tube secondary 372 is exposed, this is a very comfortable number. Copper tube secondaries of this type have conducted currents up to 1,000 A/cm$^2$ without significant heating effects. The major limitation is the primary side copper losses. Examining the dimensions of the transformer core 374, the following expression is obtained for the magnetic flux density $B_m$:

$$B_m = \frac{E}{4.0 * f * n * A_c} \quad (1)$$

For the following conditions

E=40 volts, the secondary voltage, f=20 kHz, the transformer operating frequency, and n=1, the number of turns in the secondary; then $B_m$=0.3T.

Therefore, if the core is 1 cm thick, the total CWT is 8.33 cm long. The overall dimensions of the transformer are 13.3 cm×14.2 cm×7.2 cm, giving a volume of 1482 cm$^2$. The overall weight of the transformer will be approximately 7.5–9 kilograms.

Referring again to FIG. 24, top and bottom bus conductors 414 and 416, which may be formed as planar sheets of copper or another conductor, are connected to the secondary tube 372. For the configuration shown in FIG. 27, the bus conductors 414 and 416 may be connected to the secondary tubes 380 and 382 via the copper straps 386 and 387, as shown in FIG. 29, respectively. The common bus bar 390 is also connected to the diode configurations 204 and 206, as shown in FIG. 24. Preferably, the bus conductors 414 and 416 and bus bar 390 are made of a relatively high resistivity conductor to provide even current sharing among the diodes of the diode configurations 204 and 206. Current sharing will occur if the voltage drop across the bus conductors 414 and 416 and bus bar 390 is approximately 0.1 volts at full current. Preferably, dissimilar metal junctions between the bus bars 414, 416 and 390, the diode configurations 204 and 206, and the connections to the secondary tubes such as straps 386 and 388 should be avoided.

At high current output levels, the diode configurations 204 and 206 will need to have substantial heat removed. At 2,000 amps, the heat generated in the diode configurations 204 and 206 could easily exceed 2 kW. Thus, the top and bottom bus conductors 414 and 416 are preferably interfaced with cooling mechanisms 430, such as fins and a fan for air cooling. Other cooling mechanisms 430 may also be employed.

The output bus conductors 414 and 416 may be designed to accommodate ferrite cores 432. The output inductors 208 and 210 may be formed by placing the cores 432 around the output bus conductors 414 and 416. Filter capacitors 434 can also be connected with the bus conductors 414 and 416 if required.

The entire output side circuit structure 124 as show in FIG. 24 may be formed as one integrated unit which may be attached between the transformer 158 and the load, which is connected at the ends 436 of the bus conductors 414, 416 and 390. This integrated output circuit assembly 414 may be rated for various applications by current and/or voltage level. Moreover, the integrated assembly 124 may be encased in a potting material and provided in a separate enclosure.

Figure 30:
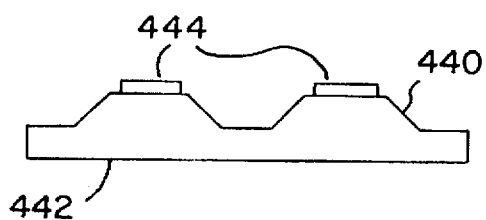
FIG. 30 is a side view of a dual Shottky diode structure such as may be used in the output side of the DC-to-DC converter of the present invention.

As has been already mentioned, output rectifiers 204 and 206 are preferably composed of configurations of multiple diodes in parallel which are capable of handling currents of 1,000–5,000 A. Single diodes having such high current ratings may not be available for all applications or may be relatively expensive. This will be particularly true of fast diodes, which are normally either available in much smaller current ratings, or have much higher voltage ratings than needed. High voltage ratings are accompanied by higher forward voltage drops across the diodes, resulting in slower turn-on and turn-off speeds. Thus, multiple high volume diodes, such as the dual 300 A 60V Shottky diodes made by Motorola, may be employed. A side view of such a dual Shottky diode 440 is shown in FIG. 30, with anode end 442 and cathode ends 444. These Shottky diodes typically have a $V_f$ of 0.64 volts, instead of the 1.2 volt turn on voltage typical for large silicon diodes. At 2,000 amps, this gives a conduction loss of 1.28 kW, as opposed to 2.4 kW, a significant power savings. Fast recovery puck-type diodes may also be used for the diode configurations 204 and 206. The same basic configurations as described below for the Shottky diodes 440 may be employed if puck-type diodes are used. Ultimately, the choice of diodes used depends on converter specification and cost constraints.

Figure 31:
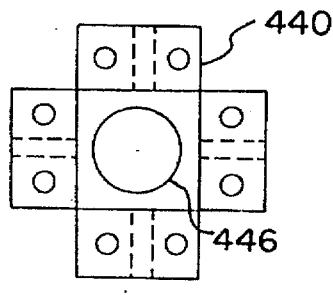
FIG. 31 is an illustrative plan view of a preferred rectifier assembly configuration for the output side of the DC-to-DC converter of the present invention.
Figure 32:
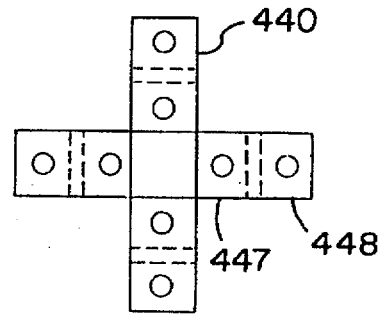
FIG. 32 is an illustrative plan view of an alternative (not preferred) rectifier assembly configuration for the output side of the DC-to-DC converter of the present invention.

Due to the very high current outputs of the DC-to-DC converter of the present invention, it is important that there is static and dynamic current sharing among the diodes 440 in the rectifier configurations 204 and 206. One diode configuration for achieving the desired current sharing is shown in FIG. 31. The circle 446 represents the physical center of the rectifier configuration assembly, which will be discussed in more detail below. With four dual Shottkys 440 arranged in parallel as shown, a highly symmetrical arrangement is achieved. With the four diode configuration shown, a current rating of up to 2,400 A can be achieved. With derating, this number will be lower, possibly 2,000 A. By contrast, the configuration of the diodes 440 shown in FIG. 32 is not symmetrical for current sharing purposes. In this arrangement, current will not be evenly shared between the inner diode 447 of the diode pair 440 and the outer diode 448 of the diode pair 440. This is because each diode in the pair 440 is a different distance from the center of the diode configuration. The diode configuration of FIG. 32 will also tend to be bigger.

Figure 33:
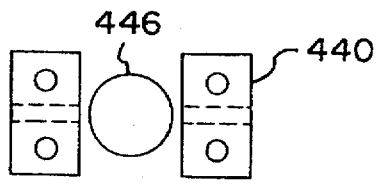
FIGS. 33–36 are illustrative plan views of further alternative rectifier assembly configurations for the output side of the DC-to-DC converter of the present invention for providing various converter output current ratings.
Figure 34:
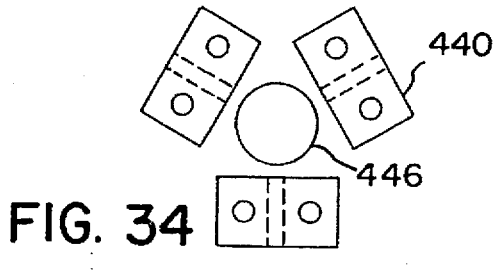
Figure 35:
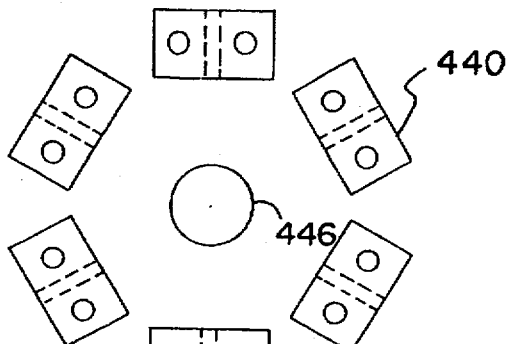
Figure 36:
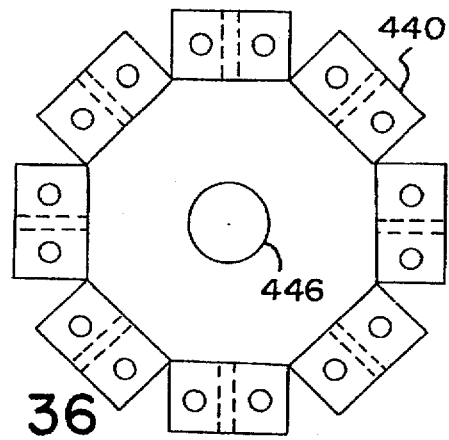

Variations of the symmetrical configuration shown in FIG. 31 are used for achieving other current ratings. For example, FIG. 33 shows a configuration of two pair of Shottky diodes 440 with an associated current rating of 1,200 A. FIG. 34 shows a symmetrical configuration of three pairs of Shottky diodes for a current rating of 1,800 A. FIG. 35 shows a symmetrical configuration of six pairs of Shottky diodes for a current rating of 3,600. FIG. 36 shows a symmetrical arrangement of eight pairs of Shottky diodes for a current rating of 4,800. As explained above, whichever diode configuration is used, the diodes should be positioned within the secondary winding as much as possible to reduce leakage inductances and to avoid voltage spikes in the output side circuit 124.

Figure 37:
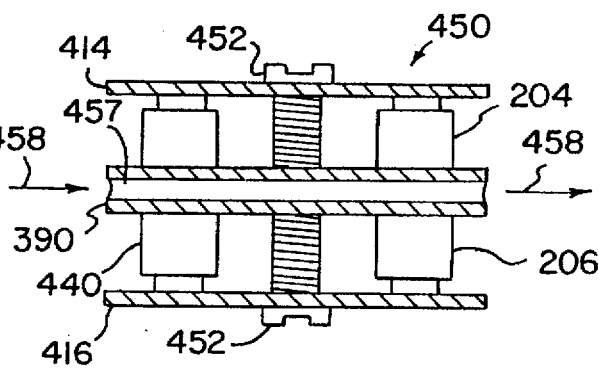
FIG. 37 is an illustrative cross-sectional view of a rectifier assembly for the output side of a DC-to-DC converter in accordance with the present invention.

As shown in FIG. 37, both rectifier configurations 204 and 206, consisting of symmetrically arranged diodes 440, may be integrated into a single diode assembly 450. The diode assembly 450 uses fasteners 452, such as bolts, to compress the diode configurations 204 and 206 securely between the top and bottom bus conductors 414 and 416 and the common bus bar 390 which is the output side circuit ground. Since, as already mentioned, high currents in the output side circuit 124 will result in a significant heating of the bus bars and diodes, the common bus 390 may be hollow so that a cooling fluid such as air or water may be circulated through a channel (or channels) 457 in the common bus 390, as indicated by the arrows 458, to cool the bus 390 and the diode configurations 204 and 206.

It is understood that the invention is not confined to the particular embodiments set forth herein as illustrative, but embraces all such forms thereof as come within the scope of the following claims.

What is claimed is:

1. DC to DC power conversion apparatus, comprising:
   (a) a transformer having a primary side and a secondary side;
   (b) first and second converter bridges for connecting a DC power source to the primary side of the transformer, each converter bridge including switching devices for connecting and disconnecting the DC power source to the primary side of the transformer and for connecting and disconnecting a unipolar bias voltage source having a voltage of polarity opposite to that of the DC power source to the primary side of the transformer;
   (c) an output side circuit including first and second rectifier structures for connecting the secondary side of the transformer to a load;
   (d) control means for controlling the switching devices to alternately connect the DC source to the primary through the first converter bridge and the second converter bridge to produce a waveform on the secondary side of the transformer which is rectified by the first and second rectifier structures, and for further controlling the switching devices to connect the unipolar bias voltage to the primary side of the transformer to drive a current in a one of the rectifier structures to zero in a period of time after a one of the converter bridges disconnects the DC source from the primary of the transformer and before an other of the converter bridges connects the DC source to the primary of the transformer.

2. The power conversion apparatus of claim 1 wherein the transformer is a co-axial winding transformer.

3. The power conversion apparatus of claim 2 wherein the secondary side of the transformer is constructed from a copper tube and the primary side of the transformer is enclosed within the tube.

4. The power conversion apparatus of claim 3 wherein the transformer includes two straight cooper tubes connected by a cooper strap to form the secondary side.

5. The power conversion apparatus of claim 1 wherein the DC power source is an AC to DC converter.

6. The power conversion apparatus of claim 1 wherein the switching devices are transistors.

7. The power conversion apparatus of claim 6 wherein the switching devices are insulated gate bipolar transistors.

8. The power conversion apparatus of claim 1 wherein the bias voltage is provided by a DC to DC converter having an input connected to the DC power source and an output which provides the bias voltage.

9. The power conversion apparatus of claim 1 wherein the rectifier structures include multiple diodes connected in parallel.

10. The power conversion apparatus of claim 9 wherein the multiple diodes in the rectifier structures are configured symmetrically to provide approximately equal current sharing among the diodes.

11. The power conversion apparatus of claim 1 wherein the output side circuit includes:

(a) first and second bus conductors connected to the secondary side of the transformer;

(b) a common bus conductor providing a first output terminal for the power conversion apparatus;

(c) a rectifier assembly connecting the first rectifier structure between the first bus conductor and the common bus conductor and the second rectifier structure between the second bus conductor and the common bus conductor; and (d) first and second inductors, the first inductor connecting the first bus conductor to a second output for the power conversion apparatus and the second inductor connecting the second bus conductor to the second output for the power conversion apparatus.

12. The power conversion apparatus of claim 11 wherein the first and second inductors are ferrite cores placed around the first and second bus conductors.

13. The power conversion apparatus of claim 11 including cooling means for cooling the rectifier assembly.

14. The power conversion apparatus of claim 13 wherein the cooling means includes a channel in the common bus conductor which is capable of containing a cooling fluid.

15. DC to DC power conversion apparatus, comprising:

(a) a transformer having a primary side and a secondary side;

(b) first and second converter bridges for connecting a DC power source to the primary side of the transformer, each converter bridge including switching devices for connecting and disconnecting the DC power source to the primary side of the transformer and for connecting and disconnecting a unipolar bias voltage source having a voltage of polarity opposite to that of the DC power source to the primary side of the transformer;

(c) an output side circuit including first and second rectifier structures having anode ends and cathode ends, first and second output side inductors, and an output, one of the anode ends or cathode ends of the first and second rectifier structures connected together and connected to a first terminal of the output, the other of the cathode end or anode end of the first rectifier structure connected to a first end of the secondary side of the transformer and the other of the cathode end or anode end of the second rectifier structure connected to a second end of the secondary side of the transformer, and the first output side inductor connected between the other of the cathode end or anode end of the first rectifier structure and a second terminal of the output and the second output side inductor connected between the other of the cathode end or anode end of the second rectifier structure and the second terminal of the output;

(d) control means for controlling the switching devices to alternately connect the DC source to the primary through the first converter bridge and the second converter bridge to produce a waveform on the secondary side of the transformer which is rectified by the first and second rectifier structures to produce a DC output across the first and second terminals of the output, and for further controlling the switching devices to connect the unipolar bias voltage to the primary side of the transformer to drive a current in a one of the rectifier structures to zero in a period of time after a one of the converter bridges disconnects the DC source from the primary of the transformer and before an other of the converter bridges connects the DC source to the primary of the transformer.

16. The power conversion apparatus of claim 15 wherein the transformer is a co-axial winding transformer.

17. The power conversion apparatus of claim 15 wherein the DC power source is an AC to DC converter.

18. The power conversion apparatus of claim 15 wherein the bias voltage is provided by a DC to DC converter having an input connected to the DC power source and an output which provides the bias voltage.

19. The power conversion apparatus of claim 15 wherein the rectifier structures include multiple diodes connected in parallel.

20. The power conversion apparatus of claim 19 wherein the multiple diodes in the rectifier structures are configured symmetrically to provide approximately equal current sharing among the diodes.

21. DC to DC power conversion apparatus, comprising:

(a) a transformer having a primary side and a secondary side;

(b) first and second converter bridges connected in parallel across a DC power source, each converter bridge including switching devices for connecting and disconnecting the DC power source to the primary side of the transformer and for connecting and disconnecting a unipolar bias voltage source having a voltage of polarity opposite to that of the DC power source to the primary side of the transformer;

(c) an output side circuit including first and second rectifier structures for connecting the secondary side of the transformer to a load;

(d) control means for controlling the switching devices to alternately connect the DC source to the primary through the first converter bridge and the second converter bridge to produce a waveform on the secondary side of the transformer which is rectified by the first and second rectifier structures, and for further controlling the switching devices to connect the unipolar bias voltage to the primary side of the transformer to drive a current in a one of the rectifier structures to zero in a period of time after a one of the converter bridges disconnects the DC source from the primary of the transformer and before an other of the converter bridges connects the DC source to the primary of the transformer.

22. The power conversion apparatus of claim 21 wherein the transformer is a co-axial winding transformer.

23. The power conversion apparatus of claim 21 wherein the DC power source is an AC to DC converter.

24. The power conversion apparatus of claim 21 wherein the bias voltage is provided by a DC to DC converter having an input connected to the DC power source and an output which provides the bias voltage.

25. The power conversion apparatus of claim 21 wherein the output side circuit includes first and second rectifier structures having anode ends and cathode ends, first and second output side inductors, and an output, one of the anode ends or cathode ends of the first and second rectifier structures connected together and connected to a first terminal of the output, the other of the cathode end or anode end of the first rectifier structure connected to a first end of the secondary side of the transformer and the other of the cathode end or anode end of the second rectifier structure connected to a second end of the secondary side of the transformer, and the first output side inductor connected between the other of the cathode end or anode end of the first rectifier structure and a second terminal of the output and the second output side inductor connected between the other of the cathode end or anode end of the second rectifier structure and the second terminal of the output.

26. The power conversion apparatus of claim 25 wherein the rectifier structures include multiple diodes connected in parallel.

27. DC to DC power conversion apparatus, comprising:
  (a) a transformer having a primary side and a secondary side;
  (b) first and second converter bridges connected in series across a DC power source, each converter bridge including switching devices for connecting and disconnecting the DC power source to the primary side of the transformer and for connecting and disconnecting a unipolar bias voltage source having a voltage of polarity opposite to that of the DC power source to the primary side of the transformer;
  (c) an output side circuit including first and second rectifier structures for connecting the secondary side of the transformer to a load;
  (d) control means for controlling the switching devices to alternately connect the DC source to the primary through the first converter bridge and the second converter bridge to produce a waveform on the secondary side of the transformer which is rectified by the first and second rectifier structures, and for further controlling the switching devices to connect the unipolar bias voltage to the primary side of the transformer to drive a current in a one of the rectifier structures to zero in a period of time after a one of the converter bridges disconnects the DC source from the primary of the transformer and before an other of the converter bridges connects the DC source to the primary of the transformer.

28. The power conversion apparatus of claim 27 wherein the transformer is a co-axial winding transformer.

29. The power conversion apparatus of claim 27 wherein the DC power source is an AC to DC converter.

30. The power conversion apparatus of claim 27 including first and second input side capacitors connected in series across the DC power source and wherein the first converter bridge is connected in parallel with the first input side capacitor and wherein the second converter bridge is connected in parallel with the second input side capacitor.

31. The power conversion apparatus of claim 27 wherein the bias voltage is provided by a DC to DC converter having an input connected to the DC power source and an output which provides the bias voltage.

32. The power conversion apparatus of claim 27 wherein the bias voltage is applied across first and second bias voltage capacitors connected in series, and wherein the bias voltage across the first bias voltage capacitor is the bias voltage source for the first converter bridge and the bias voltage across the second bias voltage capacitor is the bias voltage source for the second converter bridge.

33. The power conversion apparatus of claim 27 wherein the output side circuit includes first and second rectifier structures having anode ends and cathode ends, first and second output side inductors, and an output, one of the anode ends or cathode ends of the first and second rectifier structures connected together and connected to a first terminal of the output, the other of the cathode end or anode end of the first rectifier structure connected to a first end of the secondary side of the transformer and the other of the cathode end or anode end of the second rectifier structure connected to a second end of the secondary side of the transformer, and the first output side inductor connected between the other of the cathode end or anode end of the first rectifier structure and a second terminal of the output and the second output side inductor connected between the other of the cathode end or anode end of the second rectifier structure and the second terminal of the output.

34. The power conversion apparatus of claim 33 wherein the rectifier structures include multiple diodes connected in parallel.

35. A method for controlling a DC to DC power conversion apparatus, comprising the steps of:
  (a) closing a first switching device to apply a DC source voltage having a first polarity to a primary of a transformer to forward bias a first rectifier connected to a secondary of the transformer and to reverse bias a second rectifier connected to the secondary of the transformer;
  (b) opening the first switching device to remove the DC source voltage having a first polarity from the transformer;
  (c) closing a second switching device to apply a unipolar bias voltage having a polarity opposite to that of the first polarity to the primary of the transformer to drive a current in the first rectifier to zero;
  (d) closing a third switching device to apply a DC source voltage having a second polarity to the primary of the transformer to reverse bias the first rectifier and forward bias the second rectifier;
  (e) opening the second switching device to remove the unipolar bias voltage from the transformer;
  (f) opening the third switching device to remove the DC source having a second polarity from the transformer; and
  (g) closing a fourth switching device to apply a unipolar bias voltage having a polarity opposite to that of the DC source voltage having second polarity to the primary of the transformer to drive a current in the second rectifier to zero.

36. The method of claim 35 comprising the additional step of opening the fourth switching device to remove the unipolar bias voltage from the primary of the transformer after the step of closing the first switching device to apply the DC source voltage having a first polarity to the transformer.

37. The method of claim 35 wherein the step of closing the third switching device to apply the DC source voltage having a second polarity to the transformer and the step of opening the second switching device to remove the unipolar bias voltage from the transformer are accomplished approximately simultaneously.

38. The method of claim 35 comprising the additional step of repeating steps (a)–(g) at a frequency of at least 20 kHz.

39. The method of claim 35 wherein the steps of closing and opening the first and third switching devices include the step of switching devices in a converter bridge to connect and disconnect a DC voltage source to and from the primary of the transformer, and wherein the steps of closing and opening the second and fourth switching devices include the step of switching the devices in the converter bridge to connect a unipolar bias voltage source to and from the transformer.

40. A co-axial winding transformer for high currents, comprising:
   (a) two straight conducting tubes connected by a conducting strap to form a secondary winding of the transformer;
   (b) primary windings enclosed within the conducting tubes; and
   (c) a transformer core positioned around the conducting tubes.

41. The transformer of claim 40 wherein the conducting tubes and conducting strap are made of copper.

42. A rectifier and filter apparatus for the output side of a high current power conversion apparatus, comprising:
   (a) first and second bus conductors adapted for connection to the secondary of a transformer;
   (b) a common bus bar;
   (c) a rectifier assembly including first and second diode configurations, the rectifier assembly connecting the first diode configuration between the first bus conductor and the common bus bar and the second diode configuration between the second bus conductor and the common bus bar; and
   (d) ferrite cores placed around the first and second bus conductors to form output side inductances.

43. The rectifier and filter apparatus of claim 42 additionally comprising cooling means for cooling the rectifier assembly.

44. The rectifier and filter apparatus of claim 43 wherein the cooling means includes a channel in the common bus bar which is capable of containing a cooling fluid.

45. The rectifier and filter apparatus of claim 42 wherein the diode configurations include multiple diodes connected in parallel such that there is approximately equal current sharing among the diodes in each configuration.

46. The rectifier and filter apparatus of claim 45 wherein the diodes are dual Shottky diodes.

47. DC to DC power conversion apparatus, comprising:
   (a) a transformer having a primary side and a secondary side;
   (b) first and second converter bridges for connecting a DC power source to the primary side of the transformer, each converter bridge including switching devices for connecting and disconnecting the DC power source to the primary side of the transformer;
   (c) an output side circuit including first and second rectifier structures having anode ends and cathode ends, first and second output side inductors, and an output, a one of the anode ends or cathode ends of the first and second rectifier structures connected together and connected to a first terminal of the output, the other of the cathode end or anode end of the first rectifier structure connected to a first end of the secondary side of the transformer and the other of the cathode end or anode end of the second rectifier structure connected to a second end of the secondary side of the transformer, and the first output side inductor connected between the other of the cathode end or anode end of the first rectifier structure and a second terminal of the output, and the second output side inductor connected between the other of the cathode end or anode end of the second rectifier structure and the second terminal of the output;
   (d) control means for controlling the switching devices to alternately connect the DC source to the primary through the first converter bridge and the second converter bridge to produce a waveform on the secondary side of the transformer which is rectified by the first and second rectifier structures to produce a DC output across the output terminals.

* * * * *

UNITED STATES PATENT AND TRADEMARK OFFICE
CERTIFICATE OF CORRECTION

PATENT NO. :   5,684,683
DATED      :   November 4, 1997
INVENTOR(S):   Deepakraj M. Divan, et al.

It is certified that error appears in the above-indentified patent and that said Letters Patent is hereby corrected as shown below:

In column 9, line 25 of the patent, "Which" should be --which--.

In column 13, line 23 of the patent, "ofa*$V_{in}$," should be --of a*$V_{in}$,--.

In column 13, line 24 of the patent, "a*$V_{in}$," should be --a$V_{in}$,--.

In column 15, line 29 of the patent, "$D_{s1}$" should be --$D_{s2}$--.

In column 15, line 31 of the patent, "$D_2$drops" should be --$D_2$ drops--.

In column 17, line 43 of the patent, "/$Q_2$" should be --/$Q_1$--.

In column 18, line 18 of the patent, "$V_{in}$." should be --$V_b$.--.

UNITED STATES PATENT AND TRADEMARK OFFICE
CERTIFICATE OF CORRECTION

PATENT NO. : 5,684,683
DATED : November 4, 1997
INVENTOR(S) : Deepakraj M. Divan, et al.

It is certified that error appears in the above-indentified patent and that said Letters Patent is hereby corrected as shown below:

In column 19, line 47 of the patent, --is placed around each-- should be inserted after "374" and before "secondary".

In column 19, lines 47 and 48 of the patent, after "secondary tube 380", "each secondary tube 380" should be deleted.

In column 20, line 30 of the patent, "(15.8 cm, 0.2 cm)" should be --(15.8 cm * 0.2 cm)--.

In column 20, line 49 of the patent, "1482" should not be bold.

In claim 4, column 23, line 5 of the patent, "cooper" should be --copper--.

Signed and Sealed this

Thirteenth Day of July, 1999

*Attest:*

Q. TODD DICKINSON

*Attesting Officer*  Acting Commissioner of Patents and Trademarks